US012737701B2

(12) United States Patent
Guan et al.

(10) Patent No.: US 12,737,701 B2
(45) Date of Patent: Sep. 15, 2026

(54) APPARATUS AND METHOD FOR CROP YIELD PREDICTION

(71) Applicant: THE BOARD OF TRUSTEES OF THE UNIVERSITY OF ILLINOIS, Urbana, IL (US)

(72) Inventors: Kaiyu Guan, Champaign, IL (US); Jian Peng, Champaign, IL (US); Xiangtao Xu, Arlington, MA (US); Sibo Wang, Champaign, IL (US); Bin Peng, Savoy, IL (US)

(73) Assignee: The Board of Trustees of the University of Illinois, Urbana, IL (US)

(*) Notice: Subject to any disclaimer, the term of this patent is extended or adjusted under 35 U.S.C. 154(b) by 232 days.

(21) Appl. No.: 17/415,598

(22) PCT Filed: Dec. 18, 2019

(86) PCT No.: PCT/US2019/067217

§ 371 (c)(1),
(2) Date: Jun. 17, 2021

(87) PCT Pub. No.: WO2020/132092

PCT Pub. Date: Jun. 25, 2020

(65) Prior Publication Data

US 2022/0067614 A1 Mar. 3, 2022

Related U.S. Application Data

(60) Provisional application No. 62/782,144, filed on Dec. 19, 2018.

(51) Int. Cl.

*G06T 7/00* (2017.01)
*G06Q 10/04* (2023.01)

(Continued)

(52) U.S. Cl.

CPC ....... *G06Q 10/06315* (2013.01); *G06Q 10/04* (2013.01); *G06Q 50/02* (2013.01);

(Continued)

(58) Field of Classification Search

None

See application file for complete search history.

(56) References Cited

U.S. PATENT DOCUMENTS 9,140,824 B1 * 9/2015 Mewes .................. A01D 91/00
2006/0282295 A1 * 12/2006 McComb ............... G06Q 50/02 705/4

(Continued)

FOREIGN PATENT DOCUMENTS

CN 107423850 A * 12/2017 ............. G01N 21/17
WO 2017096073 A1 6/2017

OTHER PUBLICATIONS

Stas, Michiel, et al. "A comparison of machine learning algorithms for regional wheat yield prediction using NDVI time series of SPOT-VGT." 2016 fifth international conference on agro-geoinformatics (agro-geoinformatics). IEEE, 2016. (Year: 2016).*

(Continued)

*Primary Examiner* — Sara Grace Brown

(74) *Attorney, Agent, or Firm* — McKee, Voorhees & Sease, PLC

(57) ABSTRACT

Aspects of the subject disclosure may include, for example, a device comprising: a processing system including a processor; and a memory that stores executable instructions that, when executed by the processing system, perform operations, the operations comprising: identifying an occurrence of one or multiple phenology stages of a crop, resulting in identified occurrences; optimizing, based upon the identified occurrences, a yield model, wherein the yield model produces, after the optimizing, a first predicted yield (Continued)

for a first region; and generating a second predicted yield based upon the first predicted yield, wherein the second predicted yield covers a second region that is smaller than the first region. Additional embodiments are disclosed.

18 Claims, 29 Drawing Sheets

(51) Int. Cl.
*G06Q 10/0631* (2023.01)
*G06Q 50/02* (2024.01)
*G06V 20/10* (2022.01)

(52) U.S. Cl.
CPC .............. *G06T 7/97* (2017.01); *G06V 20/188* (2022.01); *G06T 2207/10036* (2013.01); *G06V 20/194* (2022.01)

(56) References Cited

U.S. PATENT DOCUMENTS

2014/0377795 A1* 12/2014 Gannot .................. G16B 40/10 702/19
2016/0171680 A1* 6/2016 Lobell ....................... G06T 7/00 382/110
2017/0090068 A1* 3/2017 Xiang .................... G06Q 10/04
2017/0196171 A1* 7/2017 Xu ........................... A01G 7/00
2017/0213083 A1* 7/2017 Shriver ............. G01N 33/0098
2017/0228475 A1* 8/2017 Aldor-Noiman ....... G06Q 10/06
2017/0228743 A1 8/2017 Cousins et al.
2018/0018517 A1* 1/2018 Zhong ..................... G06F 18/22
2018/0070527 A1* 3/2018 Richt .................. A01B 79/005
2018/0211156 A1* 7/2018 Guan ..................... G06N 3/044
2018/0330435 A1* 11/2018 Garg ...................... G06Q 40/03
2019/0050510 A1* 2/2019 Mewes .................. G06N 3/045
2019/0156437 A1* 5/2019 Dail ................... G06Q 10/0635
2019/0325467 A1 10/2019 Perry et al.
2019/0335674 A1* 11/2019 Basso .................... A01G 22/00
2020/0126232 A1* 4/2020 Guo ...................... G06T 7/0016
2020/0134485 A1* 4/2020 Sood ........................ G06N 5/01
2022/0146409 A1* 5/2022 Hamilton ................ G01J 3/502

OTHER PUBLICATIONS

Jin, Zhenong, George Azzari, and David B. Lobell. "Improving the accuracy of satellite-based high-resolution yield estimation: A test of multiple scalable approaches." Agricultural and forest meteorology 247 (2017): 207-220. (Year: 2017).*

Haghverdi, Amir, Robert A. Washington-Allen, and Brian G. Leib. "Prediction of cotton lint yield from phenology of crop indices using artificial neural networks." Jul. 20, 2018. Computers and Electronics in Agriculture 152 (2018): 186-197. (Year: 2018).*

Verger, Aleixandre, et al. "The CACAO method for smoothing, gap filling, and characterizing seasonal anomalies in satellite time series." IEEE transactions on Geoscience and Remote Sensing 51.4 (2013): 1963-1972. (Year: 2013).*

Manfron, Giacinto, et al. "Estimating inter-annual variability in winter wheat sowing dates from satellite time series in Camargue, France." International journal of applied earth observation and geoinformation 57 (2017): 190-201. (Year: 2017).*

Darvishzadeh, R. Roshanak. "Multivariate statistical analysis for estimating grassland leaf area index and chlorophyll content using hyperspectral data." Enschded, The Netherlands: University of Twente (2015). (Year: 2015).*

Gore[1], Ramdas D., Sunil S. Nimbhore, and Bharti W. Gawali. "Understanding soil spectral signature though RS and GIS Techniques." (2015). (Year: 2015).*

Doraiswamy et al., "Operational Prediction of Crop Yields Using Modis Data and Products", ISPRS WG VIII/10 Workshop 2006—Remote Sensing Support to Crop Yield Forecast and Area Estimates, pp. 1-11, Mar. 5, 2020.

International Searching Authority in connection with PCT/US2019/067217 filed Dec. 18, 2019, "The International Search Report and the Written Opinion of the International Searching Authority, or the Declaration", 7 pages, mailed Mar. 5, 2020.

Busetto et al., "Downstream Services for Rice Crop Monitoring in Europe: From Regional to Local Scale," IEEE Journal of Selected Topics in Applied Earth Observations and Remote Sensing, vol. 10, No. 12, Dec. 2017, pp. 5423-5441.

Duncan et al., "The potential of satellite-observed crop phenology to enhance yield gap assessments in smallholder landscapes," Frontiers in Environmental Science, vol. 3, Article 56, Apr. 2015, 16 pages.

Lobell et al., "A scalable satellite-based crop yield mapper," Remote Sensing of Environment, vol. 164, 2015, pp. 324-333.

Azzari et al. "Towards fine resolution global maps of crop yields: Testing multiple methods and satellites in three countries." Remote Sensing of Environment 202 (2017): 129-141.

Barlow et al. "Simulating the impact of extreme heat and frost events on wheat crop production: A review." Field crops research 171 (2015): 109-119.

Bobryk et al. "Validating a digital soil map with corn yield data for precision agriculture decision support." Agronomy Journal 108.3 (2016): 957-965.

Bokusheva et al. "Satellite-based vegetation health indices as a criteria for insuring against drought-related yield losses." Agricultural and Forest Meteorology 220 (2016): 200-206.

Bolton et al. "Forecasting crop yield using remotely sensed vegetation indices and crop phenology metrics." Agricultural and forest meteorology 173 (2013): 74-84.

Boryan et al. "Monitoring US agriculture: the US department of agriculture, national agricultural statistics service, cropland data layer program." Geocarto International 26.5 (2011): 341-358.

Boyer et al. "The US drought of 2012 in perspective: a call to action." Global Food Security 2.3 (2013): 139-143.

Burke et al. "Satellite-based assessment of yield variation and its determinants in smallholder African systems." Proceedings of the National Academy of Sciences 114.9 (2017): 2189-2194.

Cai et al. "A high-performance and in-season classification system of field-level crop types using time-series Landsat data and a machine learning approach." Remote sensing of environment 210 (2018): 35-47.

Cai et al. "Crop yield predictions-high resolution statistical model for intra-season forecasts applied to corn in the US." 2017 Fall Meeting. Gro Intelligence Inc (2017): 1-46.

Cai et al. "Integrating satellite and climate data to predict wheat yield in Australia using machine learning approaches." Agricultural and forest meteorology 274 (2019): 144-159.

Chaney et al. "POLARIS: A 30-meter probabilistic soil series map of the contiguous United States." Geoderma 274 (2016): 54-67.

Flatnes et al. "Addressing Climate Change Through Risk Mitigation: Welfare Implications of Index Insurance in Northeastern Tanzania." Climate Change and Multi-Dimensional Sustainability in African Agriculture: Climate Change and Sustainability in Agriculture. Cham: Springer International Publishing (2016): 569-590.

Franch et al. "Improving the timeliness of winter wheat production forecast in the United States of America, Ukraine and China using MODIS data and NCAR Growing Degree Day information." Remote Sensing of Environment 161 (2015): 131-148.

Frankenberg et al. "3.10 solar induced chlorophyll fluorescence: Origins, relation to photosynthesis and retrieval." Compr. Remote Sens 3 (2018): 143-162.

Gitelson et al. "Remote estimation of canopy chlorophyll content in crops." Geophysical research letters 32.8 (2005): 1-4.

Gitelson et al. "Remote estimation of leaf area index and green leaf biomass in maize canopies." Geophysical research letters 30.5 (2003): 52-1-52-4.

Gourdji et al. "Global crop exposure to critical high temperatures in the reproductive period: historical trends and future projections." Environmental Research Letters 8.2 (2013): 1-10.

Guan et al. "Deriving vegetation phenological time and trajectory information over Africa using SEVIRI daily Lai." IEEE Transactions on Geoscience and Remote Sensing 52.2 (2013): 1113-1130.

(56) References Cited

OTHER PUBLICATIONS

Guan et al. "Improving the monitoring of crop productivity using spaceborne solar-induced fluorescence." Global change biology 22.2 (2016): 716-726.
Guan et al. "Mapping paddy rice area and yields over thai binh province in viet nam from modis, landsat, and alos-2/palsar-2." IEEE Journal of Selected Topics in Applied Earth Observations and Remote Sensing 11.7 (2018): 2238-2252.
Guan et al. "Photosynthetic seasonality of global tropical forests constrained by hydroclimate." Nature Geoscience 8.4 (2015): 284-289.
Guan et al. "The shared and unique values of optical, fluorescence, thermal and microwave satellite data for estimating large-scale crop yields." Remote sensing of environment 199 (2017): 333-349.
Holzworth et al. "APSIM-evolution towards a new generation of agricultural systems simulation." Environmental Modelling & Software 62 (2014): 327-350.
Johnson, D. M. "An assessment of pre-and within-season remotely sensed variables for forecasting corn and soybean yields in the United States." Remote Sensing of Environment 141 (2014): 116-128.
Joiner et al. "The seasonal cycle of satellite chlorophyll fluorescence observations and its relationship to vegetation phenology and ecosystem atmosphere carbon exchange." Remote Sensing of Environment 152 (2014): 375-391.
Kullback et al. "On information and sufficiency." The annals of mathematical statistics 22.1 (1951): 79-86.
Lal et al. "Climate change and multi-dimensional sustainability in African agriculture." Columbus: Springer (2016): 1-717.
Lancashire et al. "A uniform decimal code for growth stages of crops and weeds." Annals of applied Biology 119.3 (1991): 561-601.
Lobell et al. "Getting caught with our plants down: the risks of a global crop yield slowdown from climate trends in the next two decades." Environmental Research Letters 9.7 (2014): 1-8.
Lobell et al. "Greater sensitivity to drought accompanies maize yield increase in the US Midwest." Science 344.6183 (2014): 516-519.
Lobell, D. B. "The use of satellite data for crop yield gap analysis." Field crops research 143 (2013): 56-64.
Luo et al. "STAIR: A generic and fully-automated method to fuse multiple sources of optical satellite data to generate a high-resolution, daily and cloud-/gap-free surface reflectance product." Remote Sensing of Environment 214 (2018): 87-99.
Mathieu et al. "Statistical weather-impact models: An application of neural networks and mixed effects for corn production over the United States." Journal of applied Meteorology and Climatology 55.11 (2016): 2509-2527.
Peixoto et al. "The climatology of relative humidity in the atmosphere." Journal of climate 9.12 (1996): 3443-3463.
Rattalino Edreira et al. "Heat stress in temperate and tropical maize hybrids: Kernel growth, water relations and assimilate availability for grain filling." Field Crops Research 166 (2014): 162-172.
Sakamoto et al. "A crop phenology detection method using time-series MODIS data." Remote sensing of environment 96.3-4 (2005): 366-374.
Sakamoto et al. "MODIS-based corn grain yield estimation model incorporating crop phenology information." Remote Sensing of Environment 131 (2013): 215-231.
Sakamoto et al. "Near real-time prediction of US corn yields based on time-series MODIS data." Remote Sensing of Environment 147 (2014): 219-231.
Sellers et al. "Canopy reflectance, photosynthesis, and transpiration. III. A reanalysis using improved leaf models and a new canopy integration scheme." Remote sensing of environment 42.3 (1992): 187-216.
Soil Survey Staff, Survey [online], Natural Resources Conservation Service, United States Department of Agriculture, 2014. Retrieved from the Internet: <URL:https://websoilsurvey.nrcs.usda.gov/app/>, 2 pages.
Urban et al. "Estimating sowing dates from satellite data over the US Midwest: A comparison of multiple sensors and metrics." Remote sensing of Environment 211 (2018): 400-412.
Urban et al. "The effects of extremely wet planting conditions on maize and soybean yields." Climatic Change 130.2 (2015): 247-260.
Wilhelm et al. "Heat stress during grain filling in maize: effects on kernel growth and metabolism." Crop science 39.6 (1999): 1733-1741.
Xu et al. "Machine learning-based modeling of spatio-temporally varying responses of rainfed corn yield to climate, soil, and management in the US corn belt." Frontiers in Artificial Intelligence 4 (2021): 1-21.
You et al. "Deep gaussian process for crop yield prediction based on remote sensing data." Proceedings of the AAAI conference on artificial intelligence. vol. 31. No. 1. (2017): 4559-4565.
Zhang et al. "Potential monitoring of crop production using a satellite-based Climate-Variability Impact Index." Agricultural and Forest Meteorology 132.3-4 (2005): 344-358.

* cited by examiner

100 gcpl
(a)
Std. Coef.
0.50
0.25
0.00
−0.25
−0.50
w1
m7
w2
m8
w2
m7
m3
gcvi
vpd
gcvi
vpd
rad
om
prcp
prcp (c)
RMSE [t/ha]
2.0
1.5
1.0
0.5
0.0
1
3
5
7
# of variables (e)
R2
1.0
0.8
0.6
0.4
1
3
5
7
# of variables gcfl
(b)
Std. Coef.
0.50
0.25
0.00
−0.25
−0.50
w2
w1
m7
m7
m3
m3
gcvi
gcvi
vpd
om
prcp
awc
prcp
rad (d)
RMSE [t/ha]
2.0
1.5
1.0
0.5
0.0
1
3
5
7
# of variables (f)
R2
1.0
0.8
0.6
0.4
1
3
5
7
# of variables Panel (a)

(a)
Std. Coef.
0.6
0.3
0.0
−0.3
−0.6
vpd_m7
gcvi_w1
gcvi_w2
rad_w2
vpd_m8
om_mean (b)
ΔYield in 2012 [t/ha]
Bu/Ac
2
0
−2
−4
−6
−8
0
−50
−100
OBS
PRE
vpd_m7
gcvi_w1
gcvi_w2
rad_w2
vpd_m8
om_mean (c)
ΔYield in 2014 [t/ha]
Bu/Ac
6
4
2
0
75
50
25
0
OBS
PRE
vpd_m7
gcvi_w1
gcvi_w2
rad_w2
vpd_m8
om_mean

1000

APPARATUS AND METHOD FOR CROP YIELD PREDICTION

CROSS REFERENCE TO RELATED APPLICATION(S)

This application is a U.S. National Stage of International Application No. PCT/US2019/067217, having an International Filing Date of Dec. 18, 2019, which claims the benefit of priority to U.S. Provisional Patent Application No. 62/782,144, filed Dec. 19, 2018. The contents of the foregoing (including each Appendix) is hereby incorporated by reference into this application as if set forth herein in full.

STATEMENT AS TO FEDERALLY SPONSORED RESEARCH

This invention was made with government support under NNX16AI56G and 80NSSC18K0170 awarded by the National Aeronautics and Space Administration, and under 2017-67003-28703 awarded by the United States Department of Agriculture. The government has certain rights in the invention.

FIELD OF THE DISCLOSURE

The subject disclosure relates generally to an apparatus and a method for crop yield prediction. In various embodiments, the subject disclosure relates to an apparatus and a method for crop yield prediction utilizing a multi-scale, machine-learning and data-driven predictive framework.

BACKGROUND

Accurate and timely estimation of the spatio-temporal variations in crop yield can provide valuable information in various aspects related to food security, risk management, and environmental sustainability (Bobryk et al. 2016; Bokusheva et al. 2016; Burke and Lobell 2017; Flatnes and Carter 2016). In particular, crop yield information at fine spatial resolutions (e.g., field-level) can be useful to support decision-making for farmer communities and agricultural industry (Lobell, 2013). However, in most cases only regionally aggregated crop yield statistics are available and there is a lack of field-level crop yield observations to support actionable decision-making. How to effectively estimate crop yield across spatial scales remains as one of the biggest challenges in the community (Lobell et al., 2014).

Recently a few satellite remote sensing-based methods that estimate crop yield across spatial scales have been developed. The typical approaches include (1) models purely based on seasonal vegetation indices (VI) or other vegetation signals from satellite remote sensing (RS) data (Bolton and Friedl 2013; Guan et al. 2016; Sakamoto et al. 2014); combining both satellite VI and some environmental variables (e.g., Franch et al. 2015; Guan et al. 2017; Johnson 2014); and (3) integrating satellite VI, process-based models, and weather variables for yield estimation, e.g., Scalable satellite-based Crop Yield Mapper (SCYM) (Lobell et al., 2015; Jin et al., 2017). Though only using satellite-based VI for yield prediction has achieved reasonable performance (Bolton and Friedl, 2013; You et al., 2017), this approach has its limitation demonstrated by various studies (Cai et al. Under review; Guan et al. 2017). Satellite data, especially the widely used visible and near-infrared bands, mainly observe the top-canopy dynamics of crops (Guan et al., 2018). These satellite data are effective to capture crop growth condition during the vegetative-stage (i.e., pronounced changes in canopy leaf amounts and aboveground biomass), but much less so during the reproductive stage (i.e., flower, grain-filling), which usually happen below canopy for row crops and have fine-scale heterogeneity in space (Guan et al., 2018).

Adding environmental variables (e.g., climate data and soil properties) with satellite-based information should improve the yield prediction performance (Cai et al., 2017; Xu et al., in review), as the reproductive processes, though not directly observed by satellite data, are highly related to environmental conditions. However, the conventional way to integrate satellite and other sources of data is not fully optimized, and there is large potential to improve methodologies (Guan et al., 2017). In particular, the conventional approaches do not specify how to effectively combine weather/soil information with satellite data. One naive way to include environmental information is to use all the existing data and put them into statistical or machine learning models to let the models perform feature selection natively. Alternatively, the process can be selective or regularized (as described herein in connection with various embodiments) and only use, or put extra emphasis on, weather information during the critical reproductive periods (e.g. flower, grain-filling stages) when prior knowledge has indicated the importance of environmental conditions for crop growth (Barlow et al. 2015; Gourdji et al. 2013; Rattalino Edreira et al. 2014; Wilhelm et al. 1999). Using pheno-stage dependent climate variables requires the estimation or detection of the relevant pheno-stages, which becomes possible due to the recent development in deriving crop phenology information from satellite (Urban et al., 2018; Zhang et al., 2005). It is thus worth investigating (as described herein in connection with various embodiments) the benefits of explicitly including crop phenology stage information to decide the temporal window(s) of weather information for the yield prediction.

Using process-based crop models with constraints from satellite data has been an effective approach for estimating field-level crop yield, in particular as demonstrated in the SCYM algorithm. Specifically, SCYM has shown better performance and scalability than other remote sensing (RS) based approaches (Azzari et al. 2017; Jin et al. 2017; Lobell et al. 2015). The scalability of SCYM is largely attributed to the use of a well-validated process-based crop model, i.e., Agricultural Production Systems sIMulator (APSIM) (Holzworth et al, 2014). APSIM generates thousands of pseudo training samples that inherently carry the relationships among canopy aboveground biomass (late on it is estimated from satellite VI measures), weather information and crop yields, and thus can substitute ground-based measurements for deriving the yield prediction model. Despite the demonstrated success by SCYM, various embodiments described herein provide a method that is independent of any process-based models and purely driven by large-scale observation data (satellite, climate, soil, etc.). This idea is primarily motivated by the fact that process-based models have to be tuned for different places, and high-quality input data to drive those models are often difficult to collect (further, process-based models are subject to uncertainty/biases in crop physiological assumptions). For example, Jin et al. (2017) shows that incorporation of RS data for phenology calibration is a must step to improve the SCYM's performance. In contrast to SCYM type of approaches, there are several benefits from data-driven approaches (such as described herein in connection with various embodiments). First, data-driven approaches can largely avoid errors due to assumption and parameterization of a process-based model and also provide independent estimates of crop yield sensitivities to environmental factors. Second, data-driven approaches are easily extendable to different regions/crop types without the requirement of collecting high quality inputs data for process-based models (e.g., cultivar, parameters/phenology for different crop types). Third, with the accumulation of data, data-driven approaches can include sample over a wide range of climate conditions as well.

BRIEF DESCRIPTION OF THE DRAWINGS

Reference will now be made to the accompanying drawings, which are not necessarily drawn to scale, and wherein:

FIG. 3A depicts the standardized regression coefficients of variable selected by LASSO analysis for gcpa model input variables, i.e. the gcpl model. The labels in x-axis show the name of variable. gcvi denotes Green Chlorophyll Vegetation Index; vpd denotes atmospheric vapor pressure deficit, rad denotes solar radiation; om denotes soil organic matter fraction; and prcp denotes precipitation. The labels on each bar show the temporal range of each variable ("mj" refers to the jth month; "wj" refers to the jth explicitly and locally derived phenological time window). FIGS. 3C and 3E are for cross-validation RMSE and $R^2$ of predictive models using different numbers of input variables following the ranking in the panel of FIG. 3A (black dots represent model performance in the drought year 2012). FIGS. 3B, 3D and 3F are similar to respective ones of FIGS. 3A, 3B and 3E, but for LASSO analysis over gcfa model variables, i.e. the gcfl model. awc in FIG. 3B denotes soil available water content. Vertical shadings in FIGS. 3C, 3E, 3D and 3F represent the number of predictors in the best performance model selected as gcpl and gcfl. Missing black dots in FIGS. 3C and 3D are because the RMSE values are too high and off scale in 2012 for those models.

in FIG. 4C, "cm" bar relates to diagnostic, and there is no corresponding predictive bar at this location). In these FIGS. the overall model predictive and diagnostic skills are shown as including all counties and all years from 2006 to 2016. The skills are measured by RMSE (see FIG. 4A), Pearson's correlation coefficient (see FIG. 4B), and R squared (see FIG. 4C). The left-most vertical shading and the right-most vertical shading shows the model with best diagnostic and predictive skills, respectively. In FIG. 4C, negative $R^2$ values are not shown.

FIG. 5A shows average county-level yields from 2005 to 2016 from observation (black dashed line), gcpl predictive model (grey plus markers), and gcpa diagnostic model (grey square markers). FIG. 5B shows county-level yield averaged from 2005 to 2016 from observation, predictive gcpl and diagnostic gcpa models. Panels (e), (f), (g) of FIG. 5B are similar to respective ones of Panels (b), (c) (d) of FIG. 5B, but for the drought year 2012. Grey area represents counties where yield data is not available. Panel (h) of FIG. 5B is a scale associated with Panels (b), (c), (d), (e), (f), (g) of FIG. 5B.

FIG. 6A depicts standardized coefficients of the best regression model gcpl. Each boxplot shows the coefficients from input training data with different length (5-17 years). FIG. 6B shows observed (OBS) and predicted (PRE) yield anomaly relative to the average yield over the whole example period in 2012 and the contribution of the predicted yield anomaly from each input variable in the gcpl model. Each boxplot shows the statistics of yield anomalies across all the counties. FIG. 6C is similar to FIG. 6B, but for year 2014. In all these FIGS. 6A-6C, the variables are ranked by the absolute value of the median std. Coef. values. The dots in FIG. 6A represent the coefficient trained using all 17 year data. In x-axis labels, gcvi denotes Green Chlorophyll Vegetation Index; vpd denotes atmospheric vapor pressure deficit, rad denotes solar radiation; and om denotes soil organic matter fraction while "mj" refers to the jth month; "wj" refers to the ja explicitly and locally derived phenological time window.

DETAILED DESCRIPTION

Figure 1:
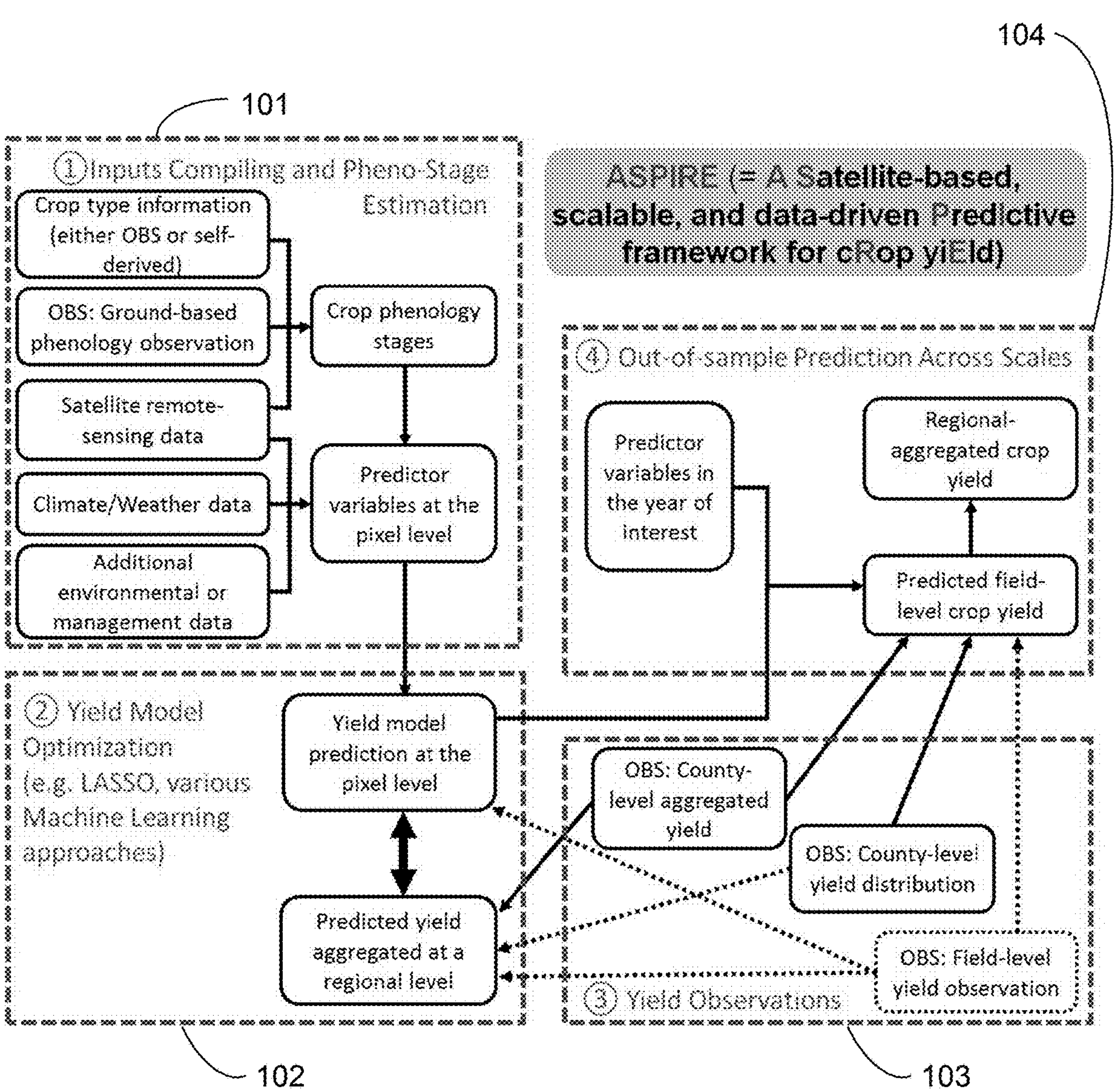
FIG. 1 depicts a schematic overview of an ASPIRE approach according to an embodiment (in this FIG. 1, the term "OBS" means observation).

One embodiment of the subject disclosure relates to a device comprising: a processing system including a processor; and a memory that stores executable instructions that, when executed by the processing system, perform operations, the operations comprising: identifying an occurrence of a phenology stage of a crop, resulting in an identified occurrence; optimizing, based upon the identified occurrence, a yield model, wherein the yield model produces a first predicted yield for a first region; and generating a second predicted yield based upon the first predicted yield, wherein the second predicted yield covers a second region that is smaller than the first region.

Another embodiment of the subject disclosure relates to a method comprising: receiving satellite data associated with a crop; identifying, based upon the satellite data, a first time window during which a phenology stage of the crop was prevalent; optimizing a yield model, resulting in an optimized yield model, wherein the optimized yield model produces a first predicted yield for a first region, wherein the optimized yield model is based upon the first time window during which the phenology stage was prevalent, and wherein the first predicted yield is based on an aggregation of a plurality of models of yields at a pixel scale or at a field scale within the first region; and predicting a second predicted yield that covers a second region that is smaller than the first region, wherein the second predicted yield is based upon the first predicted yield.

Yet another embodiment of the subject disclosure relates to a non-transitory machine-readable storage medium comprising executable instructions that, when executed by a processing system including a processor, perform operations, the operations comprising: receiving satellite data indicative of a prevalent occurrence of a phenology stage of a crop; identifying, based upon the satellite data, a first time window during which the phenology stage of the crop was prevalent, wherein the identifying results in an identified time window; optimizing a yield model, resulting in an optimized yield model, wherein the optimized yield model is used to generate a first predicted yield for a first region, and wherein the optimized yield model is based upon the first time window during which the phenology stage of the crop was prevalent; and using the first predicted yield to generate a second predicted yield that covers a second region that is smaller than the first region.

As described herein according to various embodiments is a purely data-driven framework (sometimes referred to as ASPIRE) to predict crop yield across scales (the name ASPIRE is based upon the term "A Multi-Scale, machine-learning and data-driven PredIctive framework for cRop yiEld"). A fundamental concept of the ASPIRE framework is that the key satellite observations (multispectral surface reflectance as well as derived indicators such as vegetation indices) provide an approximation of aboveground biomass, crop stress, or other crop-condition-related indicators; while environmental variables (e.g., weather, soil, and/or satellite-based stress terms) determines processes that are not captured by the satellite vegetation data, for example, the reproductive process, some biotic stresses, and/or local soil conditions. Time of critical pheno-stages of crop growth (e.g., flower stage, reproductive stages) is also estimated from satellite data; thus it is only needed to include weather at the relevant widows when modeling specific processes of crop growth (e.g., grain formation). Specifically, if some certain satellite-based observation (e.g. vegetation indices) is treated here as an approximation of aboveground biomass, and environmental variables are used to capture the rest of the yield variabilities (e.g., Harvest Index, and/or biotic stresses), a conceptual equation can be written as:

Crop yield=G [F1(crop conditions/stress detected from satellite data, environmental variables, soil properties)@Pheno-stage 1, F2(crop conditions/stress detected from satellite data, environmental variables, soil properties)@Pheno-stage 2, F3 . . . ] Eq.1 where, F1 refers to a function that integrates satellite information, environmental variables (e.g. rainfall, temperature, vapor pressure deficit), and their interactions with soil properties, all happened in the $1^{st}$ pheno-stage (i.e. Pheno-stage 1) to model the above features' impacts on the end-of-season crop yield; and F2 refers to another function that integrates satellite information, environmental variables, and their interactions with soil properties, all happened in the $2^{nd}$ pheno-stage (i.e. Pheno-stage 2) to model these features' impacts on the end-of-season crop yield. If there are more than two pheno-stages identified, there would be F3, F4, etc. G refers to a function that integrates different pheno-stages' functions (e.g. F1, F2) together to estimate end-of-season crop yield. This conceptual model (e.g. F1, F2, G functions) can be realized by using empirical and/or machine learning approaches to achieve the optimal integration of satellite and environmental data.

The ASPIRE framework is different from the previously mentioned approaches as described in more detail herein. In an embodiment the model of the ASPIRE framework calculates crop yield from input variables all at the local pixel level, and then the model is optimized at the regional scale by aggregating all the pixel-level calculated yield to any specific regional boundary (e.g, county level for the US corn); the framework of an embodiment allows for incorporating field-level single yield observation or yield distribution when they become available (not discussed further herein). Thus, the ASPIRE framework can estimate field-level yield while only using regional-aggregated yield statistics (both mean yield and yield distribution). Compared with prior studies of only using satellite-based VI and/or environmental variables, the framework of various embodiments includes various sources of predictors (satellite, climate, and soil) and uses LASSO and other machine learning approaches to automatically select variables to build the empirical model, thus simultaneously achieving parsimony and optimal model performance while also avoiding over-fitting. Compared with SCYM, the framework of various embodiments does not use any process-based models in the training, and it is purely data-driven.

In the example described herein, it is explored how much predictive performance the ASPIRE can achieve. The example also explicitly assesses the potential benefits of incorporating satellite-derived crop phenology stage information for yield prediction. In addition, also presented is the forecasting performance of the framework (i.e., using prior years' data to train the model and forecast the yield for the next year(s)) to demonstrate the out-of-sample predictive skills of the ASPIRE framework.

Referring now to FIG. 1, reference will be made to certain details of an ASPIRE modeling framework according to an embodiment. The ASPIRE modeling framework of this embodiment contains the following components. Component 101: "Inputs Compiling and Pheno-Stage Estimation". This component 101 operates to compile and integrate various observational data, with or without the pheno-stage estimations. The input data include crop type information, climate/weather data, ground-based measures, satellite data for crop conditions, and other additional environmental data (e.g., soil properties, management data). Since the ASPIRE algorithm functions at multiple scales, including pixel level, field level, county level, state level, national level, and international level, a hierarchical data processing and integration pipeline is provided. At the pixel level, fine-scale crop type information is needed, and such information can be either from existing observational data (e.g., USDA's Cropland Data Layer) or from self-derived approaches (Cai et al., 2018). This component 101 also includes options of the pheno-stage window estimation; if it is planned to include this information in modeling crop yield, the pheno-stage estimation can be conducted based on the satellite data and ground-based measures (e.g., using the approaches related to "deriving corn phenology from MODIS GCVI" that are described in more detail below and/or Urban et al. (2018)). Multiple satellite datasets are also integrated and imputed to compute high-resolution and high-frequency vegetation features for the entire growing season. For example, a new fusion algorithm, e.g. STAIR (Luo et al., 2018), or some commercial satellite data both can provide daily coverage vegetation condition at high resolutions (down to 10 meters), thus the ASPIRE framework can generate crop yield at that level. At a regional-aggregated scale (e.g., county or any municipal unit), information or features are accordingly aggregated from a finer scale.

Still referring to FIG. 1, component 102 takes crop yield observation data at various forms (i.e., from component 103) to build crop yield models and optimize model parameters. The core idea of the crop yield modeling in the ASPIRE framework of this embodiment is that it models crop yield at the finest scale (i.e., pixel level), and the optimization is achieved at the relevant scale depending on the types of observations (i.e., component 103). If only regional-aggregated yield observation is available (e.g., USDA NASS's county-level yield), the ASPIRE model will first aggregate pixel-level yield estimation to the regional scale, and then optimize the model parameters. If yield observation at finer spatial scale (i.e., field yield data or field yield map) is available (e.g., from farmer collaborators or other sources), the optimization will be conducted directly at field or pixel level. In some cases, a regional-aggregated field-level yield distribution is available, and the ASPIRE framework can also aim to incorporate this information in the training. When multiple sources of crop yield observations are available, cost functions can be built to take into account all of the observations at multiple levels to achieve the global optimization at all the scales.

In various embodiments, the training algorithm can be any machine learning algorithm. At the pixel level (due to the richness of data) various techniques can be used, such as, for example, linear model with regularization, tree models (e.g. random forest), and/or complex deep learning methods such as convolutional neural networks and recurrent neural networks. Time-series data, such as climate data and vegetation features during the growing season, can be integrated using recurrent neural networks and/or convolutional neural networks. In particular, ASPIRE can embody separate models, trained using any of the models mentioned above, to align satellite and climate time series by phenology stages, and pass on the growth stage phase shift explicit as a parameter for the crop yield estimator. The loss function, which the yield estimator is designed to minimize, can contain two terms: the sum of errors of yield estimate aggregated to regional level when compared to data collected at these spatial scales (e.g. county-level crop yield released by USDA NASS), and the sum of errors in yield estimate at each field when compared to field/farm-level yield data. Methods of dimensionality reduction and feature composition, including principal component analysis and autoencoder, can be applied to denoise the data and to simplify the model by compressing input features. Regularization approaches, including LASSO feature selection and dropout in neural networks, can be applied for improving model generalization. At regional-aggregated levels, aggregated finer-scale models can be co-trained with aggregated yield information for parameter optimization.

Still referring to FIG. 1, component 104 can apply the crop yield model to out-of-sample predictions at the pixel level, and the output can be aggregated at any spatial scales.

Reference will now be made to a Demonstration Example. In this demonstration example, only shown is the case of having the county-level corn data for observation. In addition, in this example one version of the ASPIRE framework model is trained at the county level. In this example, the focus is on the corn yield modeling in the state of Illinois (Illinois produces ~16% of the U.S. national corn production). This example covers the example period from 2000 to 2016, including an extreme drought year 2012. In addition to evaluating the performance of ASPIRE, also investigated is the sensitivity of the crop yields to various input biotic and abiotic factors in the resultant model (the investigation is also directed to understanding contributions of the aforementioned factors to spatio-temporal variations in yields).

Reference will now be made to various Methods and Data associated with the demonstration example. In particular, reference will now be made to Crop yield statistics and annual area. For crop yield data, two independent sources were used. One is the county-level corn grain yield data from the USDA National Agricultural Statistics Service (NASS), covering the example period from 2000 to 2016. The other is the field-level yield data randomly sampled every year for 100 fields with unknown location for each county from the dataset generated by Lobell et al. (2014), which was originally based on data from the USDA Risk Management Service (RMA). The NASS data was first used to train and validate the ASPIRE model at the county-level. Subsequently, it was tested whether the ASPIRE model can capture the RMA field-level yield distribution within a county, assuming the 100 fields/county/year provides sufficient samples to represent county*year between-field yield heterogeneity. The latter one is used to validate whether the ASPIRE model trained using the county-level yield data can capture between-field yield variability.

To test the benefits of including satellite-based phenology for predicting crop yield, a parsimonious model can be used as described herein to extract pixel-level crop phenology stages from satellite data, benchmarked with the region-aggregated weekly progress report data from USDA NASS. This NASS weekly crop progress report data provides the percentage of corn area at a specific phenology stage at agricultural district levels or state levels. Note that the state-level progress report data are available from 2000 to 2016, while the agricultural district-level data are only available from 2014-2016. For annual corn area, used was the USDA Cropland Data Layer (CDL) data (Boryan et al. 2011) at 30 m spatial resolution.

Still referring to various Methods and Data associated with the demonstration example, reference will now be made in particular to Satellite-based vegetation index. Used was the collection 6 daily MODIS/Terra and Aqua combined Nadir BRDF-Adjusted Reflectance (NBAR) data (MCD43A4 V006) to calculate vegetation index over the period of corn yield data. A mosaic of four MODIS tiles (h10v04, h10v05, h11v04, h11v05) provides the full coverage of the State of Illinois. The original global 500 m sinusoidal projection was converted to the geographic projection using the nearest neighbor resampling approach. Both the mosaic and reprojection processings were conducted using the official MODIS Reprojection Tool (MRT). Specifically, used was the Green Chlorophyll Vegetation Index (GCVI), which is calculated using MODIS band 2 (Near Infrared, NIR) and band 4 (Green) (GCVI=NIR/Green-1) (Gitelson et al., 2003) and only "good" quality data was used based on the quality flag information. GCVI has been found to have a universal relationship with leaf area index for corn and soybean, and has less saturation issues than the widely used NDVI (Gitelson, 2005). Gap-free and smoothed time series of GCVI were generated by applying the Savitzky-Golay filter. Though there is availability of various other satellite data across different spectral ranges which can be used for crop yield estimation (Guan et al., RSE, 2017), here was used only reflectance-based VI due to its long-term and consistent record, high signal-to-noise ratio, relatively fine spatial scale, and the straightforward interpretation (a proxy of aboveground biomass and/or top-canopy photosynthetic capacity) (Sellers et al., 1992); the adoption of VI also means that the method of this embodiment can be applied to higher resolution satellite data (e.g. Landsat, Sentinel-2, and Planet Lab's Cubesat). Meanwhile, the ASPIRE framework allows more satellite RS data to be incorporated, which can be implemented in other embodiments.

Still referring to various Methods and Data associated with the demonstration example, reference will now be made in particular to Climate and soil information. The Daymet historical daily weather dataset with a 1 km×1 km spatial resolution is obtained from the Oak Ridge National Laboratory Distributed Active Archive Center (ORNL DAAC). Used were five variables from Daymet, including precipitation, minimum and maximum temperature, humidity, shortwave radiation. Then, vapor pressure deficit (VPD) was calculated from maximum temperature and humidity (Peixoto et al., 1996; Lobell et al., 2014). Soil available water content (AWC) and soil organic matter (OM) properties are taken from the POLARIS dataset (Chaney et al., 2016), which is resampled and remapped from the Soil Survey Geographic (SSURGO) database (Soil Survey Staff, 2014). These two properties for top 30 cm soil were estimated as a depth-weighted-average of the first three layers in the POLARIS dataset (0-5, 5-15, 15-30 cm). Including deep-depth soil data (up to 2 m) does not change the results here.

Still referring to various Methods and Data associated with the demonstration example, reference will now be made in particular to Data preprocessing. Spatial data input, including CDL, Daymet, and POLARIS soil data, were all resampled to match the spatial resolution of MODIS data (500 m). When developing the data-driven model (described in more detail herein), the crop yield model was applied at the pixel level, and then the pixel value was aggregated to the county level weighted by pixel's corn fraction (from CDL) for each county for the optimization. In order to reduce influence of other land cover types to remote sensing data while retaining enough sample for each county, only analyzed were the MODIS pixels with at least one third of corn in this example. Such pixel selection can be avoided with higher spatial resolution remote sensing products in the future.

Reference will now be made to various Methodology and Experiment Design associated with the demonstration example. In particular, reference will now be made to Deriving corn phenology from MODIS GCVI. First, a method was established to derive the critical corn phenology stage dates from MODIS GCVI seasonality information. The focus was on silking and dough stages because they are closely related with the development of grain number, grain size/weight, and thus the final yields (Lancashire et al., 1991). It was assumed the start date of these two pheno-stage can be predicted by adding a day shift to the maximum GCVI date within a season. Here, maximum GCVI date was calculated as the median date of top 20% values within growing season (day 100-300) to avoid spurious values due to data availability and noise. A wide range of day shift from −50 to +30 was exhaustively searched. Here, negative values indicate shifts before the GCVI maximum date and positive values indicate after the maximum date. For each day shift value, simulated was weekly pheno-stage progress following the USDA progress report. In specific, for each agricultural district and the state of Illinois, calculated was the daily fraction of MODIS pixels that have achieved the phenology threshold defined by the local GCVI maximum date plus the day shift value. Linear regressions were then conducted for the corresponding GCVI-derived pheno-stage fraction against the observed fraction. Extracted were several regression statistics, including $R^2$, regression slope, and root mean square errors (RMSEs), to assess the performance of each day shift values. In this example, used were the day shift values that generate the lowest RMSE for silking and dough period, respectively.

Still referring to various Methodology and Experiment Design associated with the demonstration example, reference will now be made in particular to Crop yield predictive models. Both satellite VI and environmental variables provide useful information to crop yield. However, there can be strong collinearity between these variables, which may lead to overfitting and reduce the predictive performance if all of them are incorporated in a predictive model. In order to assess the limitation of different datasets in predicting corn yield and search for the best predictive model, compared were four sets of regression models to predict corn yields with different complexity and data inputs (see Table 1, below). Within each model set, compared were locally variable phenology windows derived from GCVI ("p") and fixed phenology windows ("f"). For the variable phenology window setup, used were the 10 days following the GCVI-derived silking date as the first phenology window and the 10 days following the GCVI-derived dough date as the second phenology window. For the latter setup (i.e., fixed window), the first phenology window was set as day 180-190 and the second phenology window was set as day 225-235, based on the SCYM analysis results (Lobell et al. 2015).

The four sets of regression models to predict corn yields with different complexity and data inputs (see Table 1, below) are briefly described below. The first set of models only consist of climatic variables using the multiple regressions (denoted as "Climate-only Models"), but differ in the resolution and timing of the climatic data used (cm, cp, and cf, where "c" refers to "climate", "m" refers to "monthly"). The second set of models only use GCVI as predictor for the multiple regressions (denoted as "RS-only Models"), and have two models (i.e., gp and gf, where "g" refers to "GCVI"). The third set of models use both climatic variables, GCVI, and soil variables (gcp, gcf, gcpa, gcfa, where "a" refers to include all the existing predictor variables (that is, all input variables that are available without regularization/simplification)) for the multiple regressions (denoted as "Climate+RS+Soil Models" or also "All-variable Models"). For the fourth set of models, the same inputs as in the third set of models was used, but an advanced machine-learning based regression model, called Least Absolute Shrinkage and Selection Operator (LASSO) (Tibshirani, 1996) was applied to select variables to find the most parsimonious model with the highest prediction performance (denoted as "LASSO+ALL Models"), which includes two models (i.e., gcpl and gcfl, where "1" means applying using LASSO). Then the selected variables were used to conduct multiple regressions.

Specifically for the "LASSO+ALL" modeling group, for each of the two models (i.e., gcpl and gcfl), generated first was an ensemble of training years. Each ensemble is defined as consecutive years from 2000 to 2016 with a length of at least 5 years (91 ensembles in total). Second, used were four LASSO penalty parameters, ranging from 0.05, 0.01, 0.001 to 0.0001 to represent different magnitude of penalty. In total, conducted were 91*4=364 LASSO regressions for each model. We then extracted predictors that have non-zero coefficient for over 75% of all the ensembles and rank them using the absolute values of their standardized coefficient. As the last step, constructed were the regression models gcpl and gcfl by sequentially adding the top 8 important variables from LASSO analysis over gcpa and gcfa. For both gcpl and gcfl, compared were regression models by gradually introducing input variables following their importance ranks.

TABLE 1

Definition and performance of different regression models.

| Model group | Model code | Predictive Variables (number of variables) | Diagnostic skills* | Predictive skills* |
|---|---|---|---|---|
| Climate-Only Model | cm | Monthly climate ** data from March to September (35) | RMSE: 1.01 t/ha, 16.1 bu/ac r = 0.89 | RMSE: 2.38 t/ha, 37.9 bu/ac r = 0.28 |
| | cp | Climate data from two phenology windows (10) | RMSE: 1.20 t/ha, 19.0 bu/ac r = 0.85 | RMSE: 1.43 t/ha, 22.8 bu/ac r = 0.79 |
| | cf | Climate data from two fixed windows (10) | RMSE: 1.30 t/ha, 20.7 bu/ac r = 0.82 | RMSE: 1.52 t/ha, 24.2 bu/ac r = 0.78 |
| RS-only Model | gp | GCVI from two phenology windows (2) | RMSE: 1.07 t/ha, 17.1 bu/ac r = 0.91 | RMSE: 1.26 t/ha, 20.1 bu/ac r = 0.90 |
| | gf | GCVI from two fixed windows (2) | RMSE: 1.31 t/ha, 20.8 bu/ac r = 0.86 | RMSE: 1.63 t/ha, 26.1 bu/ac r= 0.72 |
| All-variables Model | gcp | GCVI and climate from two phenology windows (12) | RMSE: 0.80 t/ha, 12.7 bu/ac r = 0.94 | RMSE: 0.99 t/ha, 15.8 bu/ac r = 0.90 |
| | gcf | GCVI and climate from two fixed windows (12) | RMSE: 0.87 t/ha, 13.8 bu/ac r = 0.92 | RMSE: 1.10 t/ha, 17.5 bu/ac r = 0.90 |
| | gcpa | gcp + cm + soil data (awc, om) + year (50) | RMSE: 0.63 t/ha, 10.1 bu/ac r = 0.96 | RMSE: 2.18 t/ha, 34.7 bu/ac r = 0.54 |
| | gcfa | gcf + cm + soil data (awc, om) + year (50) | RMSE: 0.66 t/ha, 10.5 bu/ac r = 0.96 | RMSE: 1.61 t/ha, 25.6 bu/ac r = 0.78 |
| LASSO-All Model | gcpl | Use lasso to select variables from gcpa (6) | RMSE: 0.73 t/ha, 11.6 bu/ac r = 0.95 | RMSE: 0.79 t/ha, 12.6 bu/ac r = 0.94 |
| | gcfl | Use lasso to select variables from gcfa (4) | RMSE: 0.79 t/ha, 12.5 bu/ac r = 0.94 | RMSE: 0.89 t/ha, 14.1 bu/ac r = 0.93 |

*Both diagnostic and predictive skills are calculated against yields from 2008 to 2015 for comparison with the SCYM model (RMSE = 0.84 t/ha, r = 0.93) presented in Jin et al. (2017)

** "climate data" include monthly average solar radiation (rad), vapor pressure deficit (vpd), precipitation (prcp), daily maximum temperature (tmax), daily minimum temperature (tmin).

Reference will now be made to various Model Performance Assessment associated with the demonstration example. In particular, reference will now be made to Model performance in predictive and diagnostic skills. Defined were predictive skill and diagnostic skill to assess each model. Predictive skill is measured by out-of-sample predictive performance in time. In order to avoid noise and biases due to too small training data sets, we included at least the first 5 years (2000-2004) of data to train the model. For each year after 2005, the models were trained using historical data before the target year and predicted crop yield of the target year. Cross-validation of the predicted and observed county-level corn yields was then conducted. An assessment was made of the spatio-temporal variations in cross-validation RMSE, pearson's r, and $R^2$ (i.e., Coefficient of determination). These are used to assess the predictive skill.

In contrast, diagnostic skill is measured by the within-sample performance of each model. After acquiring regression coefficients from training data, conducted was cross-validation between the projected county-level yields and the observed yields within the training years but excluding 2000-2004. For each model, the diagnostic skill is expected to be higher than the predictive skill because overfitting can happen in statistical models. Models with small or nearly no overfitting indicate they likely perform better in out-of-sample predictions. Last, used was the best predictive model and diagnostic model to generate corn yield at MODIS pixel level (500 m) for each year in the example period.

Still referring to various Model Performance Assessment associated with the demonstration example, reference will now be made in particular to Model sensitivity and anomaly year analysis. Analyzed was the sensitivity of crop yield to the input variables by calculating the standardized coefficients for the best predictive model for previous analysis. In addition, one key test of predictive crop yield models is the performance during extreme years, especially years with low yields. The example period includes a major drought event in Illinois in 2012, which experienced a significant reduction in corn production (Boyer et al., 2013). Thus, highlighted is the model performance for 2012 in the analysis as well as 2014 that had the highest yield during the example period. Examined was the observed and predicted yield anomaly in those two years, and calculated was the partial contribution from each variable in the best predictive model by multiplying the deviance of each input variable from the previous years with the regression coefficient.

Still referring to various Model Performance Assessment associated with the demonstration example, reference will now be made in particular to Independent evaluation of county-level distribution prediction accuracy. One goal of the ASPIRE model according to this embodiment is to predict crop yield across scales, from field scale to regional scales. A version of ASPIRE described in connection with this work functions at the pixel level but uses county-level yield data to train the model. To test the ability of ASPIRE model's performance in capturing between-field yield variability, applied was the best model developed as described herein to all the pixels and all the years (2005-2016) for the State of Illinois (In an example case study, the best model was gcpl. However, the ASPIRE framework builds a set of candidate models, validates them and selects the best candidate model in a fully automated process. Even the application of the very same implementation (this demonstrated example) under the ASPIRE framework in a different region, or different year(s), may result in a different "best model". A "best model" that is always used is not statically chosen—the selection process of the "best model" is a part of ASPIRE).

Then compared were the simulated county-level yield distribution with the aforementioned RMA yield data. Specifically, computed was the histogram of pixel-level yield prediction given by the ASPIRE model for each county. This histogram of pixel-level yield prediction given by the ASPIRE model for each county was compared with the RMA sampled histogram. To compare two histogram distributions, used was the Kullback-Leibler divergence (i.e., KL divergence) as a metric of the entropy between the two distributions (see Eq. 2, below). This entropy score measures how accurate the pixel-level distribution of the model's prediction is (Kullback and Leibler, 1951). A higher KL divergence calculated from two distributions means a higher similarity between them.

$$KL\ div = \sum_i p_i \log\left(\frac{p_i}{q_i}\right) \quad \text{Eq. 2}$$

Where KL div is the KL divergence, $p_i$ and $q_i$ are the ith bin of the histograms of the two distributions.

Figure 2:
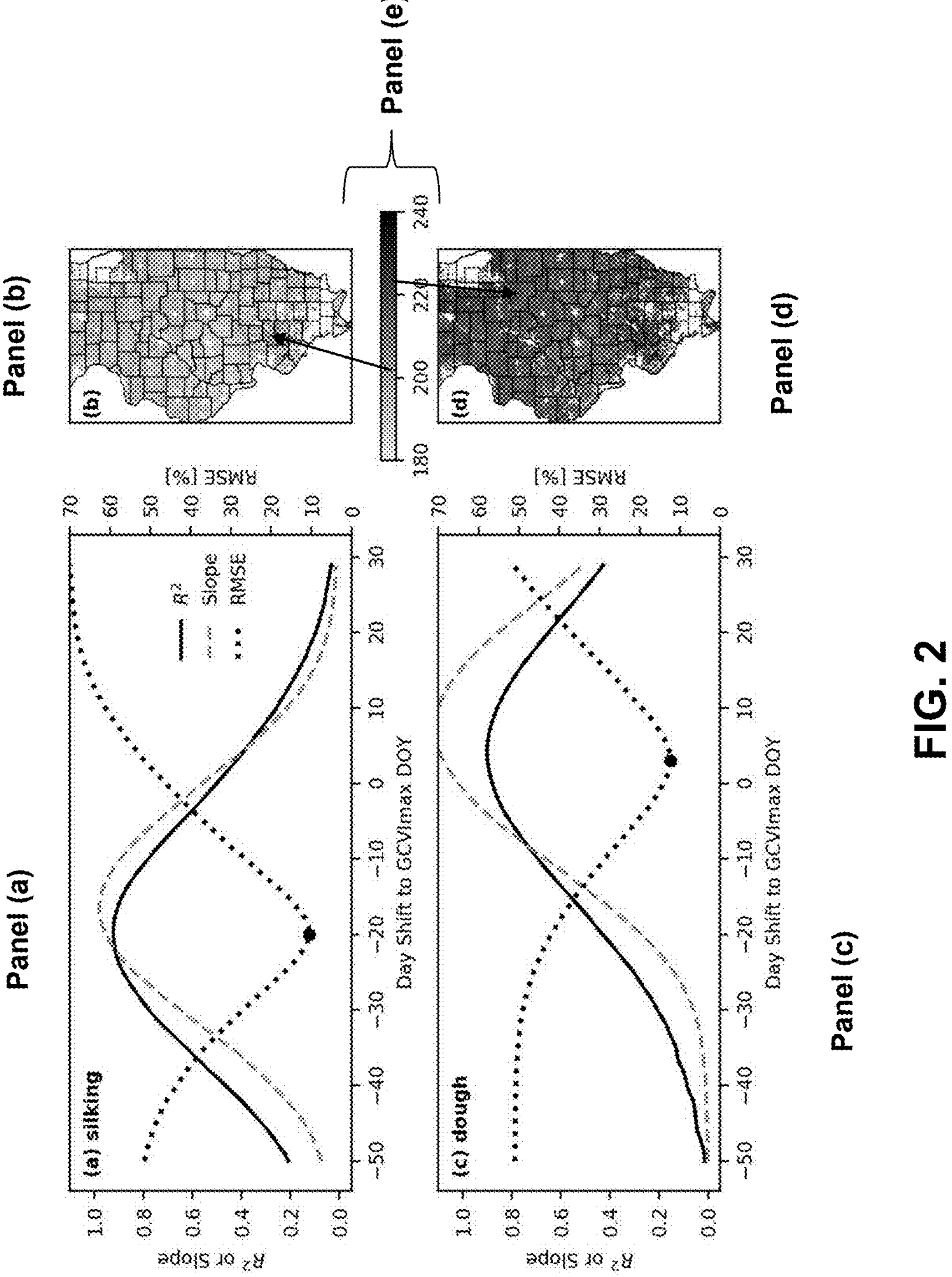
FIG. 2 depicts certain statistics according to various embodiments. Panel (a) of FIG. 2 depicts statistics from USDA reported crop silking fraction against GCVI (Green Chlorophyll Vegetation Index) derived phenology silking fraction. $R^2$ (black solid line), slope (grey dashed line), and root mean square error (RMSE, black dotted line) are shown for using different day shifts to GCVI maximum date as silking threshold. Panel (b) of FIG. 2 depicts the GCVI-derived start date of silking pheno-stage from the day shift value yielding lowest RMSE (−20) averaged over the example period. Pixels outside of Illinois or with corn fraction less than one third are masked as white. Panels (c) and (d) of FIG. 2 are similar to respective ones of Panels (a) and (b) of FIG. 2, but for dough pheno-stage. The best day shift for dough phenology is +3. Panel (e) of FIG. 2 is a scale associated with Panels (b) and (d) of FIG. 2.
Figure 14:
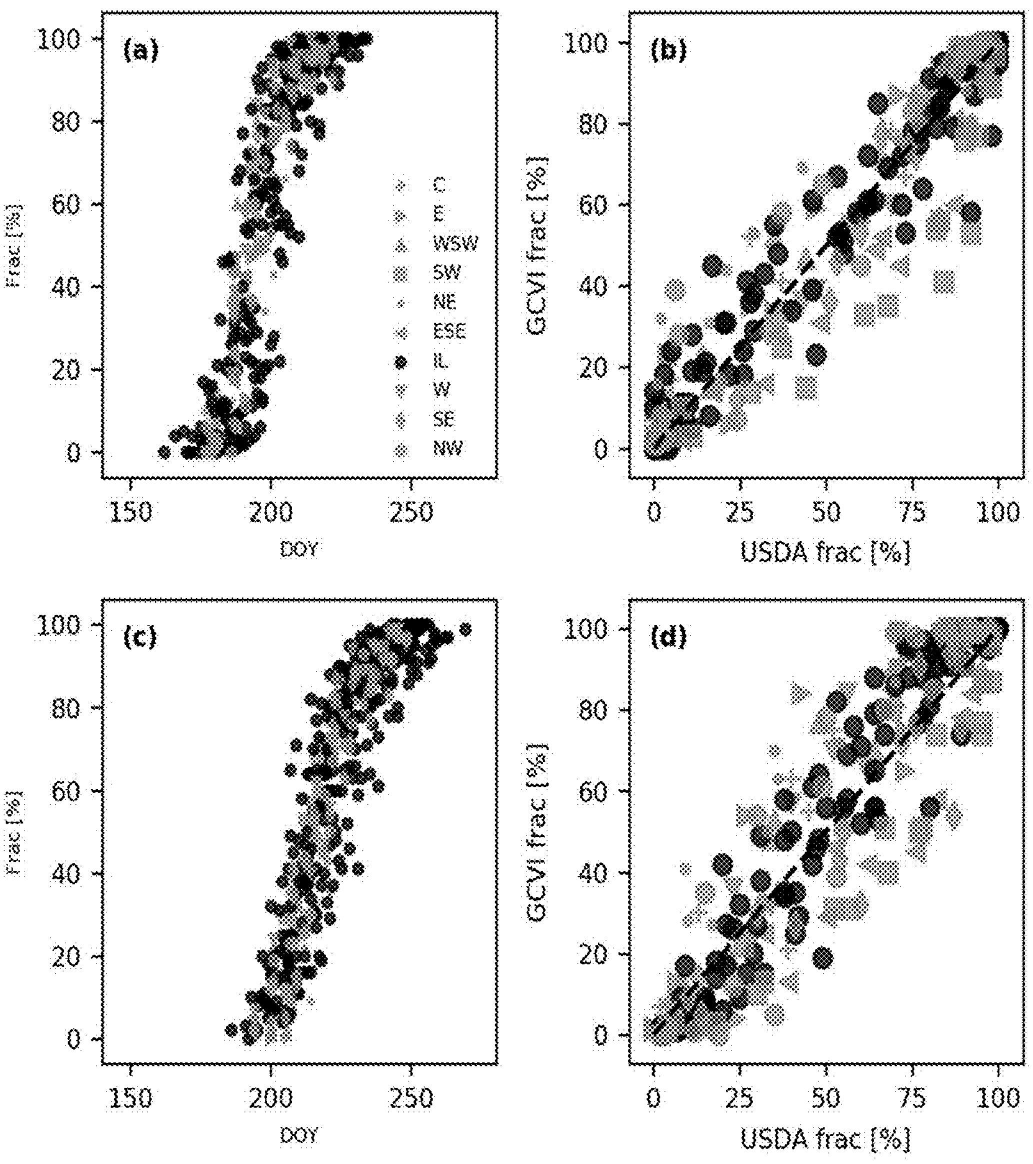
FIG. 14 depicts data obtained according to various embodiments—(a) Silking pheno-stage progress for different agricultural districts (grey symbols) in Illinois and the whole state (black dots) from USDA reports. (b) The GCVI-derived progress fraction for silking pheno-stage showing lowest RMSE plotted against the observed fraction during the same period. Black dashed line represent 1:1 line. (c-d) Same as (a-b) but for dough pheno-stage.

Reference will now be made to various Results associated with the demonstration example. In particular, reference will now be made to Satellite VI-derived phenology. First assessed was the performance of the satellite-based GCVI-derived phenology estimation for the silking and dough stages. The pixel-level phenology estimation at agricultural district level or state level in the form of fraction values were aggregated and compared with the USDA reported values. It was found that the GCVI-derived phenology estimation achieves lowest RMSE (10.5%) against the USDA reported silking dates, with −20 days shift (i.e., 20 days before the medium point of the maximum GCVI (see Panel (a) of FIG. 2). The GCVI-derived estimation has a better performance to approximate the dough stage with only +3 days shift (i.e., 3 days after the medium point of the maximum GCVI (see Panel (c) of FIG. 2), though the RMSE is slightly higher (12.3%). The $R^2$ values of the selected day shifts are 0.92 and 0.90 for silking and dough stages respectively, while the slope values are 0.95 and 1.08. The phenology fraction shows slight spatial biases (FIG. 14), with overestimates in the north and underestimates in the south. Over Illinois, the GCVI-derived average start date is around day 193 for silking (i.e., July 12) and 217 for dough (i.e., August 5). However, the dates show clear spatial patterns (see Panels (b), (d) of FIG. 2. Both pheno-stages increase from central IL to north IL, while south IL also show late onset of two pheno-stages compared with central IL.

Still referring to various Results associated with the demonstration example, reference will now be made in particular to Variable selection by LASSO. For the gcpl model, the average performance (see the small horizontal line within each box in FIGS. 3C, 3D, 3E, 3F) drops significant from a single variable to two variables and does not change much with variable numbers afterwards. Whereas the performance in the extreme year 2012 keeps decreasing until 6 input variables are included. In contrast, for the gcfl model (FIG. 3D), increasing numbers of input variables improves the performance when total variable numbers are lower than 4. The performance in year 2012 shows a similar pattern of increasing first and then decreasing in the gcpl model. Judging from the median cross-validation RMSE values, the predictive performance peaks at 6 variables for gcpl and 4 variables for gcfl (vertical shading in FIGS. 3C, 3D, 3E, 3F), which were therefore used in later analyses to construct the final gcpl and gcfl models.

Figures 3A, 3C, 3E:
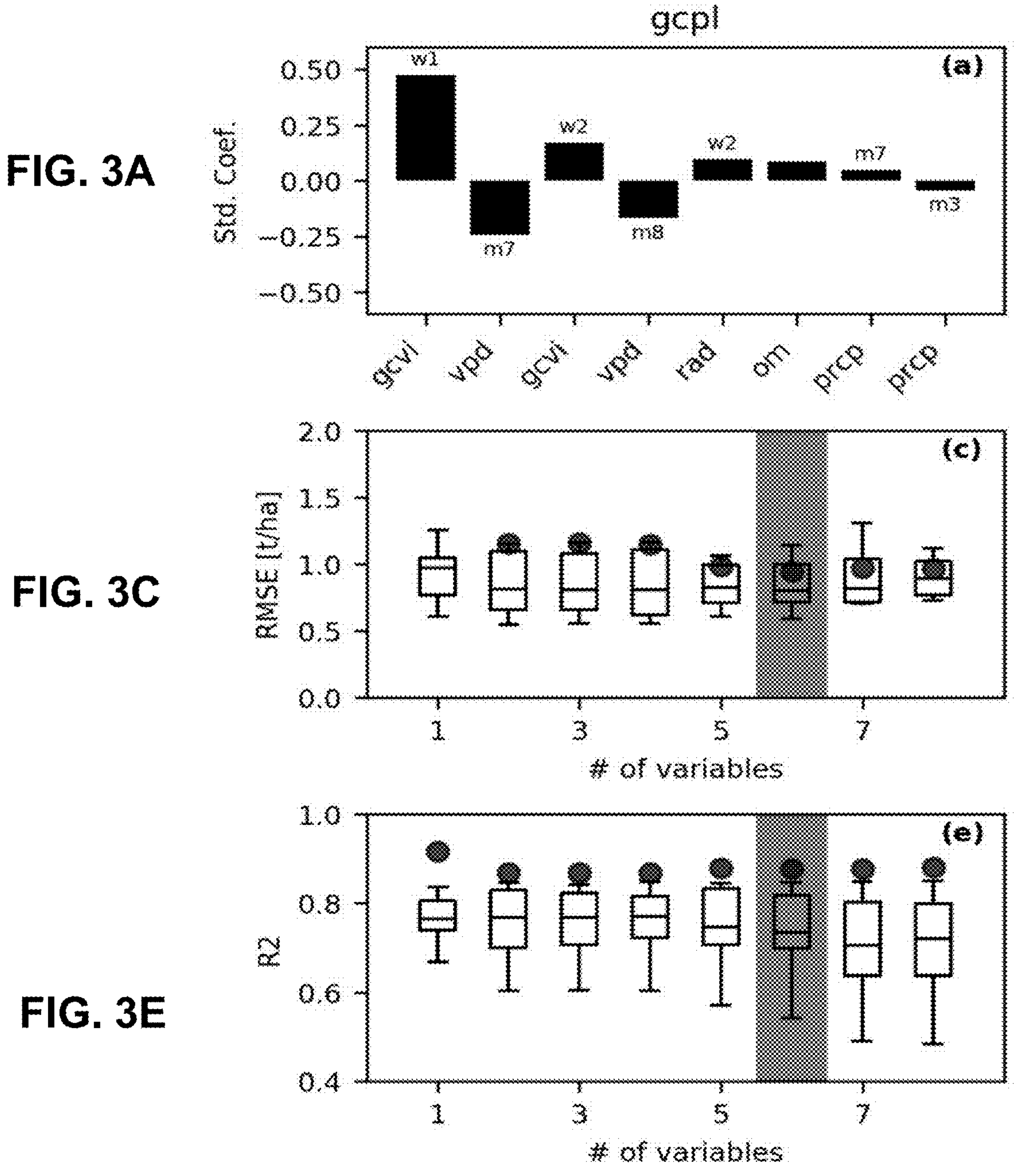
FIGS. 3A-3F depict certain statistics according to various embodiments.
Figures 3B, 3D, 3F:
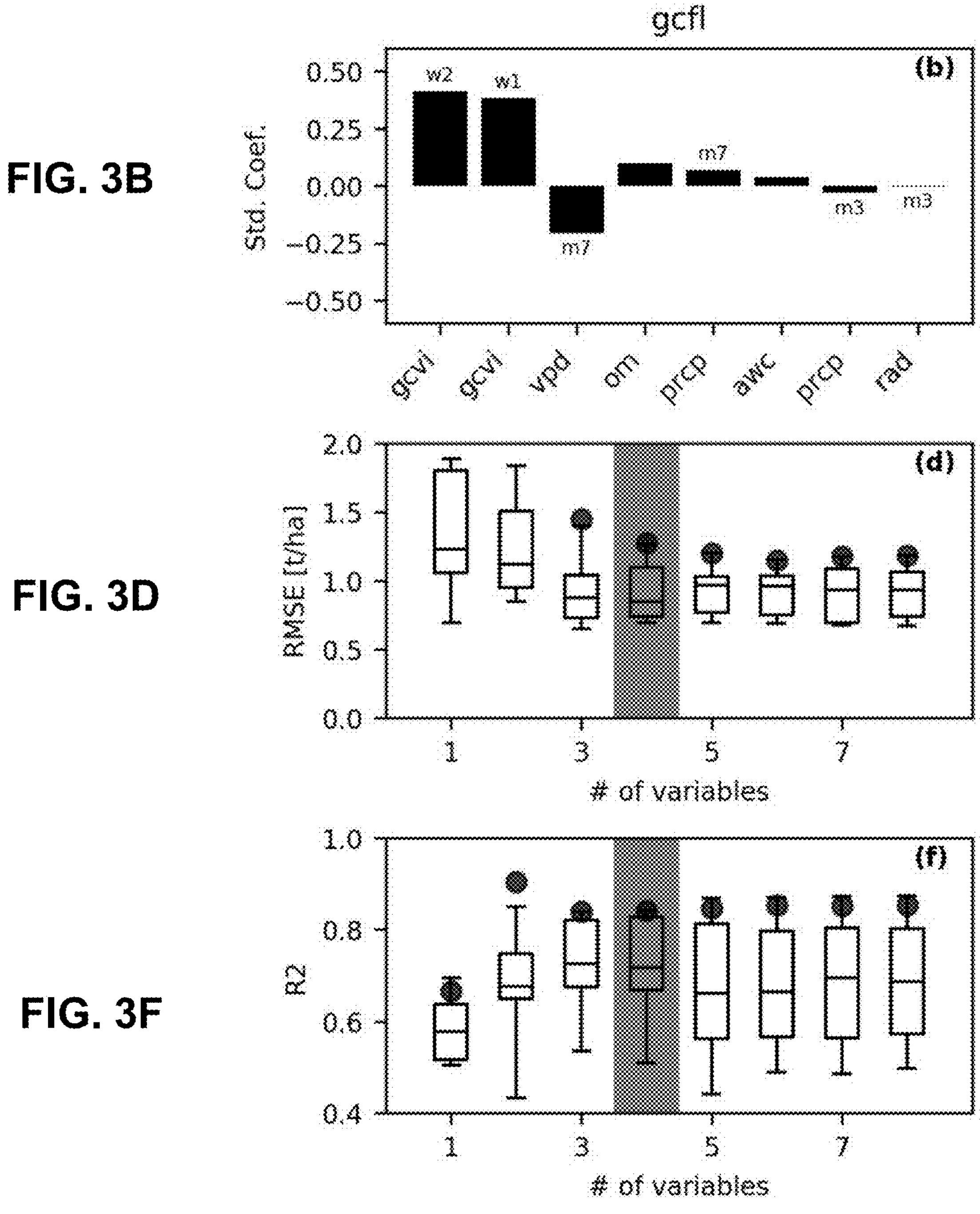

Both the gcpl and gcfl models exclude precipitation and temperature variables and instead select variables that mainly reflect crop biomass (GCVI), plant atmospheric water stress (VPD), and soil properties (OM) (FIGS. 3A and 3B). When GCVI-derived phenology windows are used (gcpl), GCVI variable of the first phenology window (silking) is more important than gcvi from the second window (dough). Variables related with summer water stress (July and August VPD) are also selected. Interestingly, radiation of the second phenology window (dough) is also chosen in gcpl. However, when fixed windows are used (gcfl), GCVI from both windows have similar importance and only July VPD was selected. As a result, fewer water stress variables are included in the gcpl model.

Figures 4A, 4B, 4C:
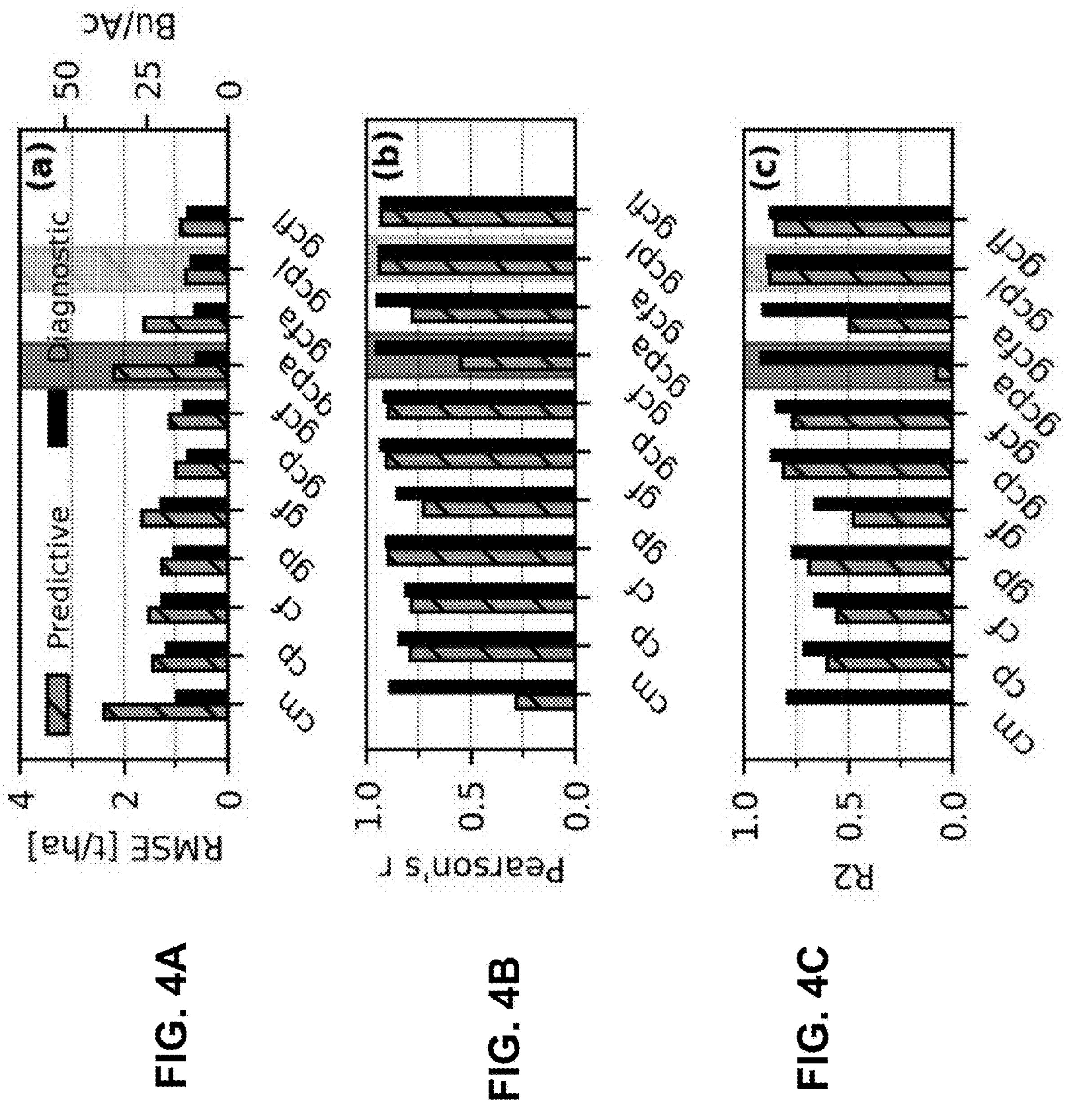
FIGS. 4A-4C depict overall model predictive and diagnostic skills according to various embodiments (in these FIGS., the predictive skills are depicted as the lighter-shaded, hatched, left-most bar of each set and the diagnostic skills are depicted as the darker-shaded, solid, right-most bar of each set.
Figure 15:
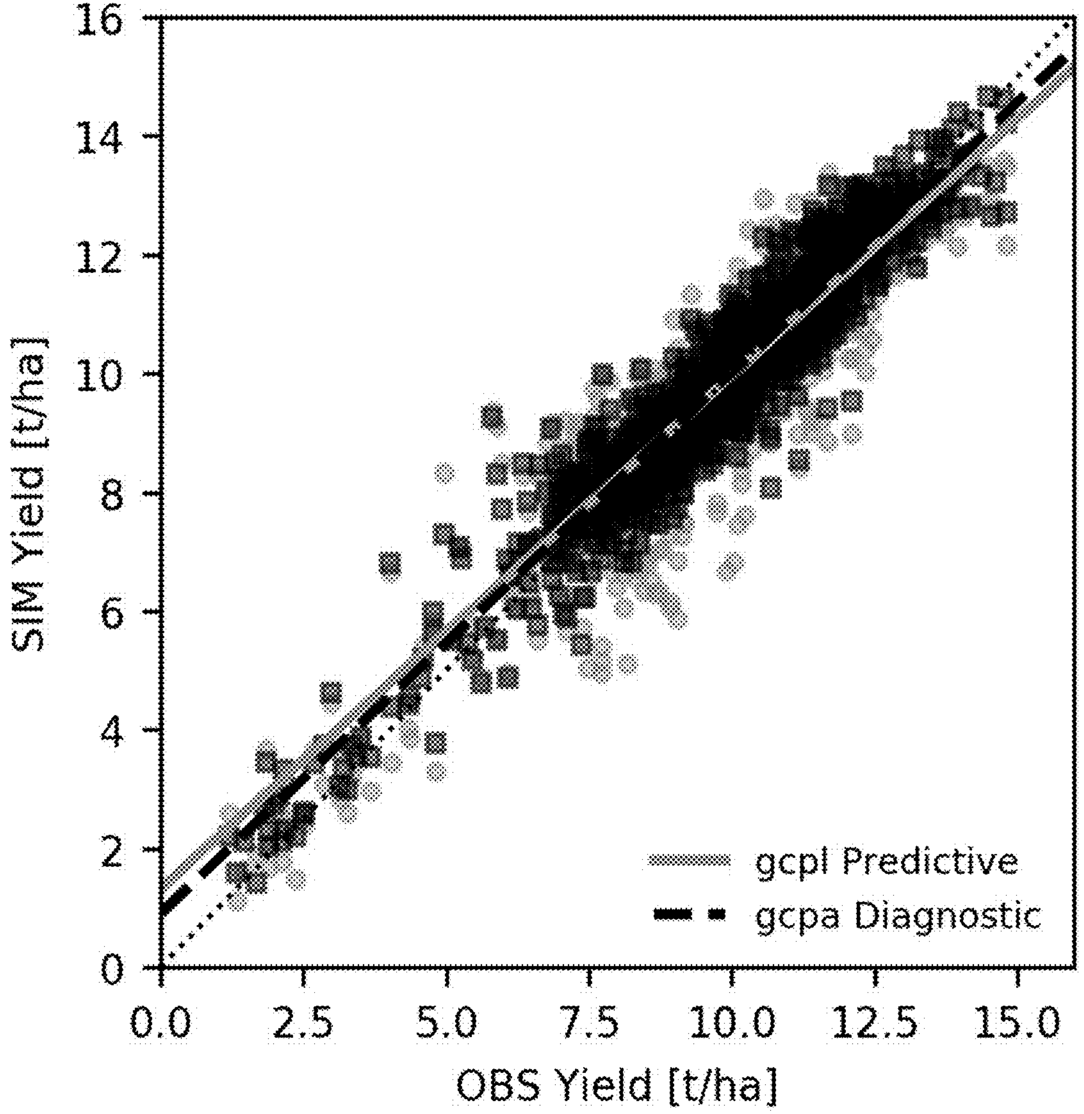
FIG. 15 depicts data obtained according to various embodiments—Scatter plots for the observed and simulated county-level yields from the best predictive model (gcpl, grey circles) and the best diagnostic model (gcpa, black squares). Each dot represents a county-year combination.

Still referring to various Results associated with the demonstration example, reference will now be made in particular to Model performance. Model performance displays substantial variations across different regression models (see Table 1 and FIGS. 4A-4C). For the diagnostic tests where all data was used to train the models, the "Climate-only" and "RS-only" models show similar skills with RMSE values around 1.0-1.3 t/ha, capturing 65%-80% of observed spatio-temporal variations in training data set (FIGS. 4A and 4C). Combining both climate and RS predictors ('All-variable' and "LASSO-All" models) yields better performance with RMSE values around 0.6-0.9 t/ha, capturing over 85% of variations in county-level yields. In addition, it is found that models that use GCVI-derived phenology (gp, gcp, gcpa, and gcpl) have slightly lower median RMSE and higher median $R^2$ values than the corresponding models that use fixed-window phenology (gf, gcf, gcfa, and gcfl). The model predictive skills are all lower than the diagnostic skills as expected with higher RMSE, lower correlation and $R^2$ (the left-most bars in each set of bars in FIGS. 4A-4C). However, the four best-performed models (gcpa, gcfa, gcpl, gcfl) in the diagnostic tests diverge in the predictive tests. The gcpa and gcfa models, which use all input variables, show an increase of over 1.0 t/ha in RMSE; whereas the gcpl and gcfl models, which use fewer input variables selected by LASSO, only show an increase of 0.1-0.2 t/ha. Taken together, the best diagnostic model is gcpa with 50 input variables, showing an RMSE of 0.63 t/ha (equivalent to 10 bushel/acre), and the best predictive model is gcpl with 8 input variables, showing an RMSE of 0.79 t/ha (equivalent to 12.6 bushel/acre). Meanwhile, these two best models both tend to slightly overestimate yields at lower end and underestimate yields at higher end (FIG. 15). These results show that "All-variable Models" without LASSO tend to overfit in the diagnostic mode (all data has been used for training and testing, with no out-of-sample test), while the use of LASSO significantly improves the predictive skills of the models with only small sacrifice of the diagnostic performance.

Figure 16:
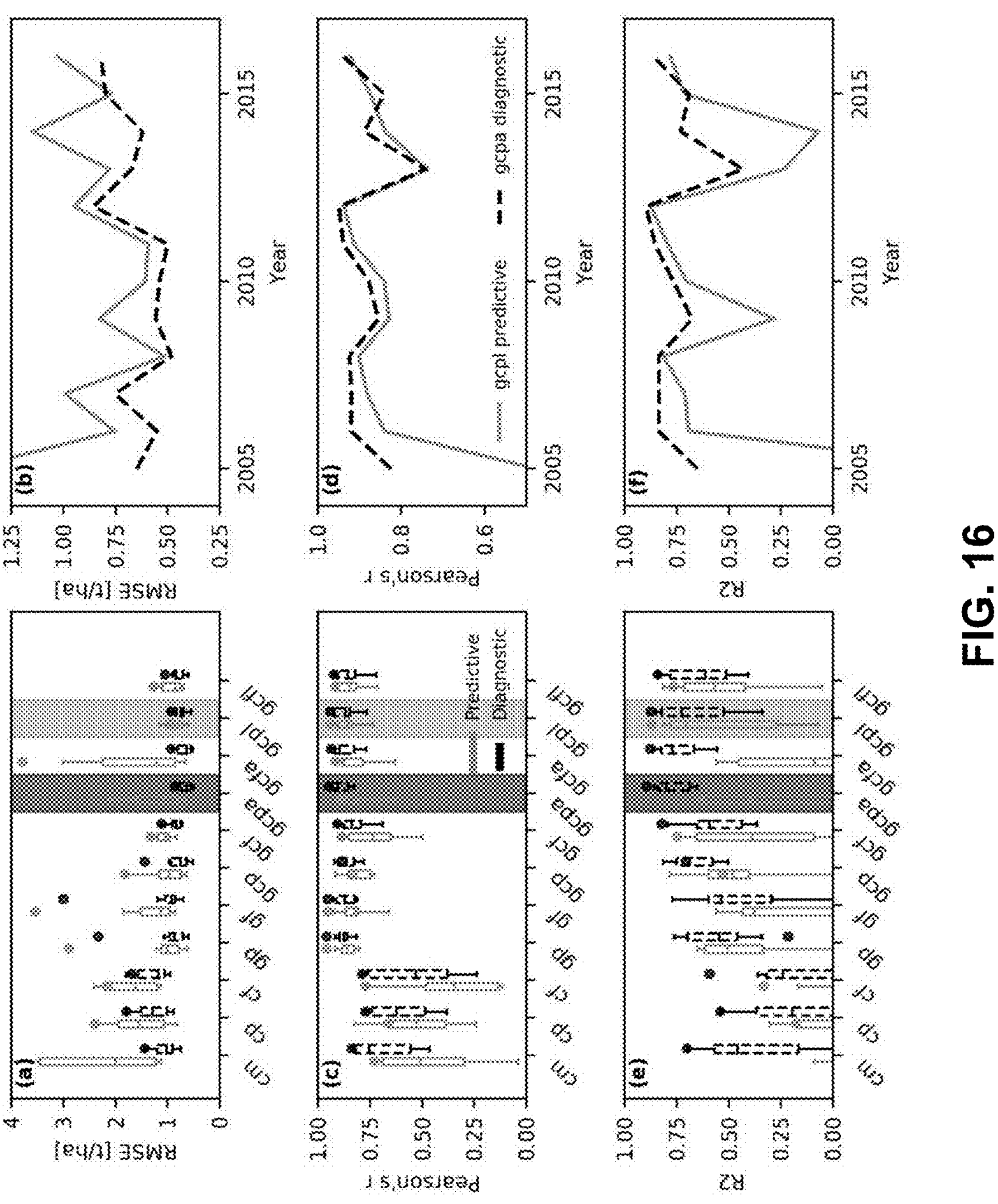
FIG. 16 depicts data obtained according to various embodiments—Temporal variations of model predictive (grey) and diagnostic (black) skills. (a) box-whisker plots of the inter-annual variations of spatial cross-validation RMSE from 2005 to 2015. In each box, the middle horizontal bar represents the median while the top and bottom of the box represents 25th and 75th percentile and the whiskers represents 5th and 95th percentile. The shading shows the model with best diagnostic/predictive skills. Dots represent performance in 2012. Dots off-scale are not shown in the plot. (b) Inter-annual variations of RMSE from gcpl, the best predictive model, and gcpa, the best diagnostic model. (c-d) Same as (a-b) but for pearson's r between the observed and modeled values. (e-f) Same as (a-b) but for $R^2$. Negative $R^2$ values are not shown.
Figure 17:
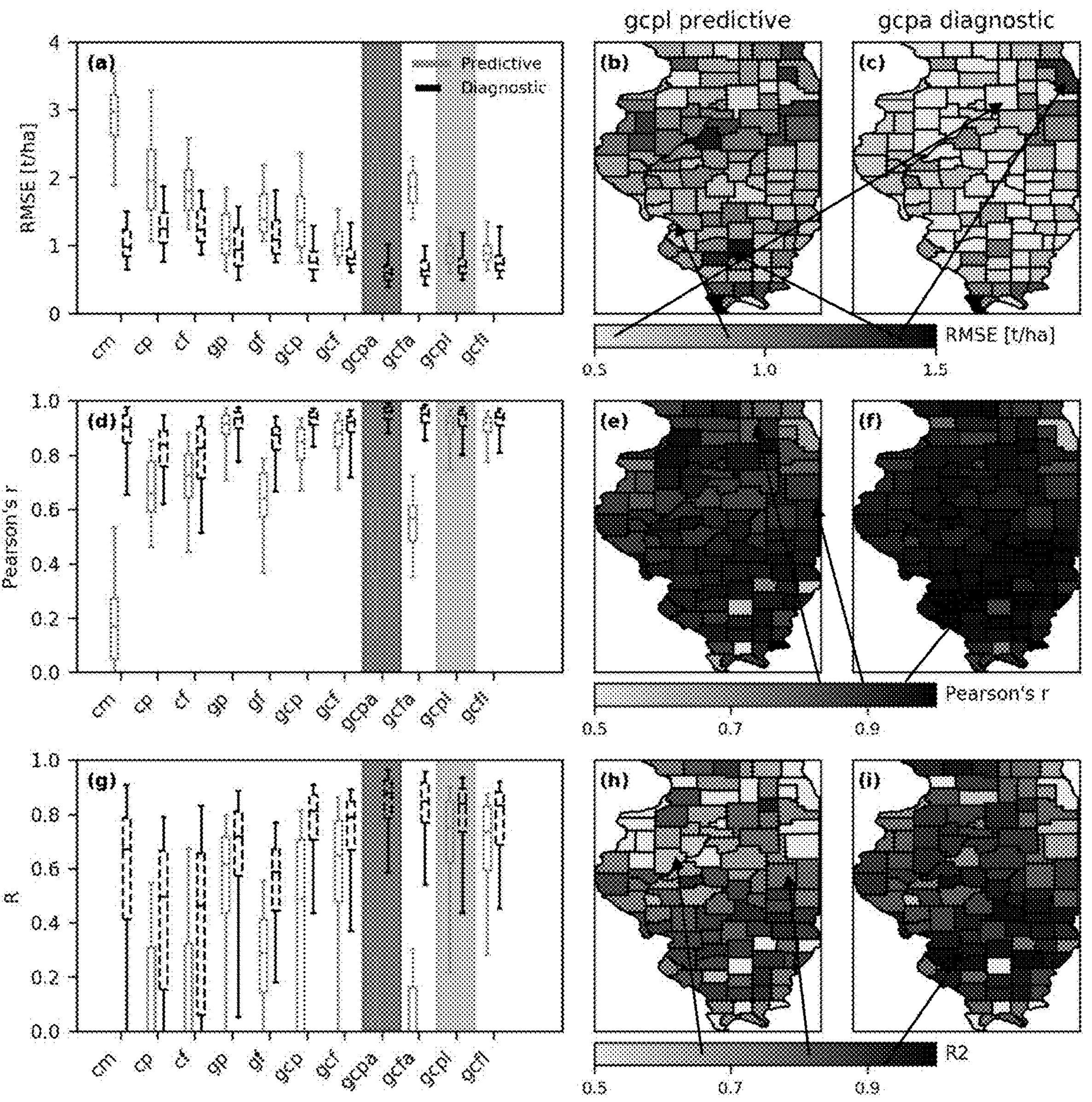
FIG. 17 depicts data obtained according to various embodiments—Spatial variations of model predictive (grey) and diagnostic (black) skills. (a) spatial variations of temporal cross-validation for each county. Color and symbols are the same as FIG. 16. (b) spatial variations of RMSE from gcpl, the best predictive model, and (c) gcpa, the best diagnostic model. (d-f) Same as (a-c) but for cross-validation pearson's r. (g-i) Same as (a-c) but for cross-validation $R^2$. Negative $R^2$ values are not shown. In spatial maps (b),(c) the left side of the corresponding horizontal scale represents better performance. In spatial maps (e),(f),(h),(i) the right side of the corresponding horizontal scale represents better performance.

The temporal and spatial variability of model performance was also analyzed. Across example years and counties, the median model diagnostic/predictive skills (FIG. 16 and FIG. 17) show similar cross-model patterns as the average model performance (FIGS. 4A-4C). However, all models show significant inter-annual and spatial variations in both diagnostic and predictive skills, comparable to cross-model variations. When focusing on the drought year 2012, all models in general show low performance measured by RMSE and $R^2$ but higher performance measured by correlation in the drought year (dots in FIG. 16). These results imply all models can capture the spatial pattern in the drought year relatively well, but the predicted yields have a systematic bias. Strikingly, the last two "All-variable Models" (i.e., gcpa and gcfa) almost fail at predicting the drought year 2012 with RMSE values of 5.7 and 3.7 t/ha (over 90% and 50% of average yields in 2012). Meanwhile, the last two "LASSO-All Models" (i.e., gcpl and gcfl) maintain low RMSE values in 2012 at 1.18 and 0.52 t/ha (10%-20% of the average yields in 2012), implying better out-of-sample predictive skills even for extreme years that are not present in training data set. When looking at the two best models (gcpl and gcpa), both models show similar inter-annual variations in performance (FIGS. 16(*b*) and (*d*)). The years showing the lowest performance are 2007 and 2012 when assessed by RMSE, and are 2013 when assessed by $R^2$. Both models show relatively reduced performance in the northeastern and southern parts of Illinois (FIG. 17(*b*), (*c*), (*e*), (*f*)), partially because corn fraction is very small in those areas (white areas in FIGS. 2B and 2D). In addition, the model performance is relatively lower in western Illinois compared with northern to central Illinois. In sum, the analyses over temporal and spatial variabilities of model performance confirm that gcpa is the best diagnostic model and gcpl is the best predictive model.

Figure 5A:
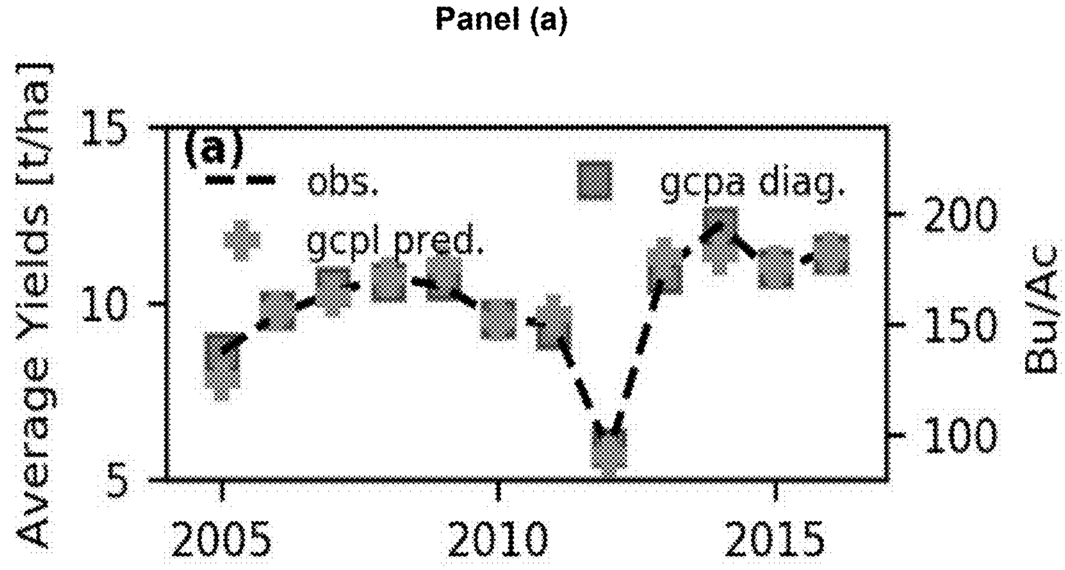
FIGS. 5A-5B depict average county-level yields from 2005 to 2016 according to various embodiments.

Finally, further investigated were the spatio-temporal average yields from the gcpl predictive model and the gcpa diagnostic model. Both models can capture the inter-annual variations in corn yields averaged over the whole state, including the drought year 2012, which almost halved the average yield (see FIG. 5A). Consistent with previous county-level analysis, the gcpa model has slightly lower bias from the observations, since all the data has been used to train the model. Both models can also capture the spatial pattern of county-level yields averaged over 2005-2016 and in year 2012. On average, observed corn yields are higher in central to northwestern counties, and are lower in southern counties. The gcpl and gcpa models both have slightly overestimated the yields in southern counties by ~1 t/ha or 16 bushel/acre (see Panels (b), (c), (d) of FIG. 5B). In 2012, a major drought hit Illinois especially in the southern counties. The observed data shows that corn yields in 2012 decreased to 2-4 t/ha in the south and 7-9 t/ha in the central and north. Only the few counties in the northwest were relatively free from the yield reduction.

Figure 5B:
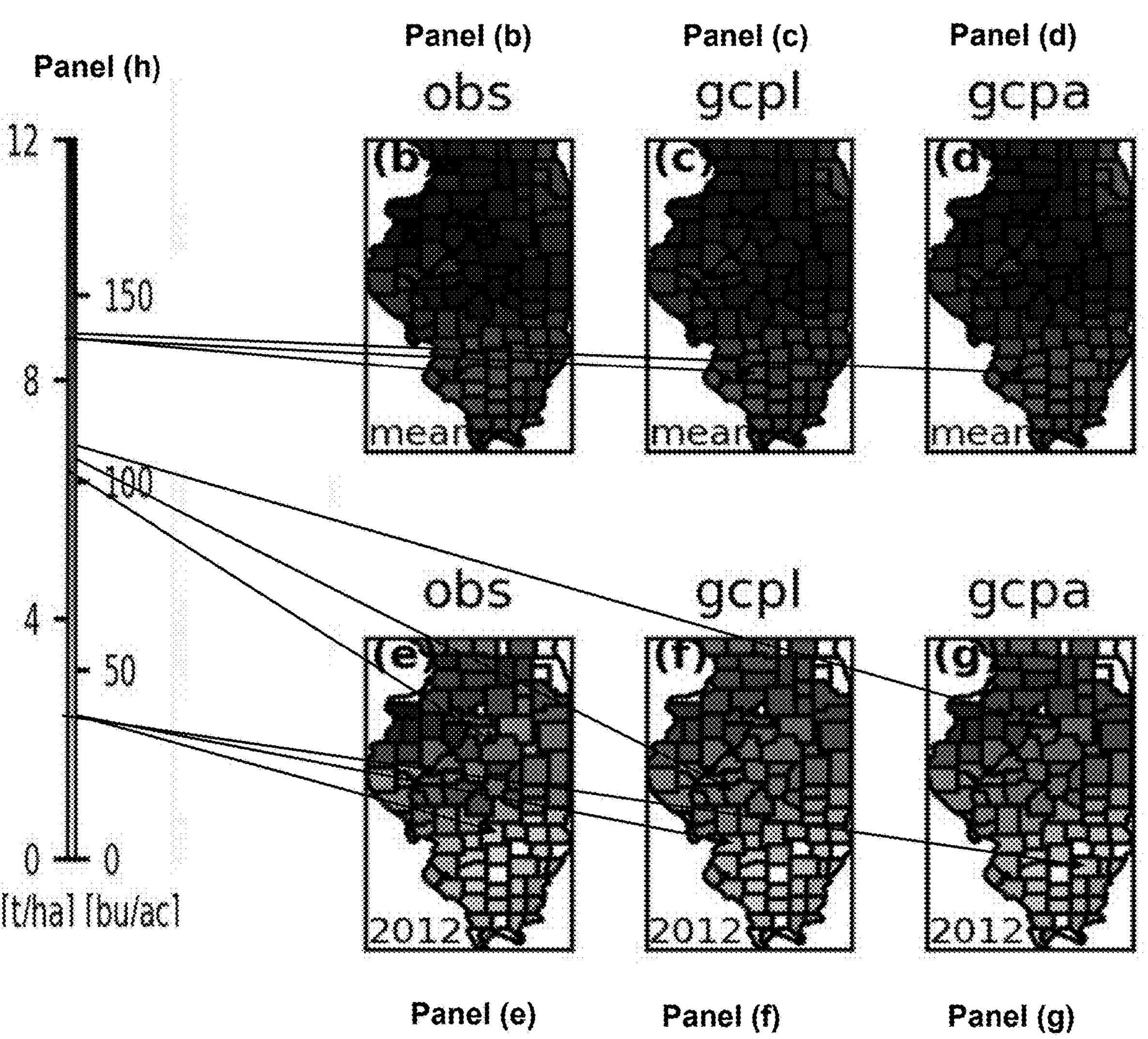

While both models can capture the general pattern and magnitude of the 2012 drought year's impact, they tend to overestimate the yields in the southern counties while slight underestimate the yields in central counties (see Panels (e), (f), (g) of FIG. 5B).

Figures 6A, 6B, 6C:
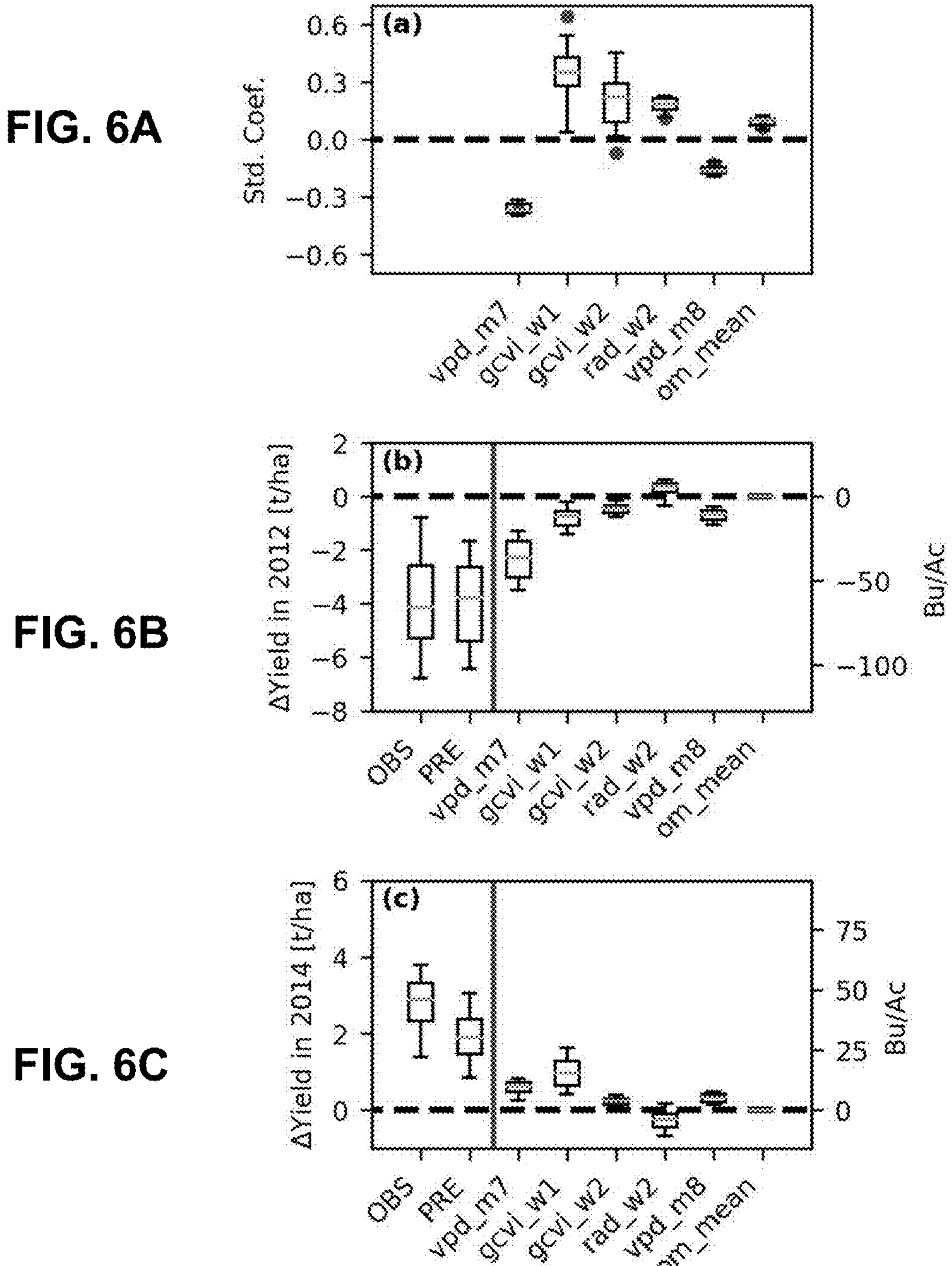
FIGS. 6A-6C depict certain statistics according to various embodiments.
Figure 18:
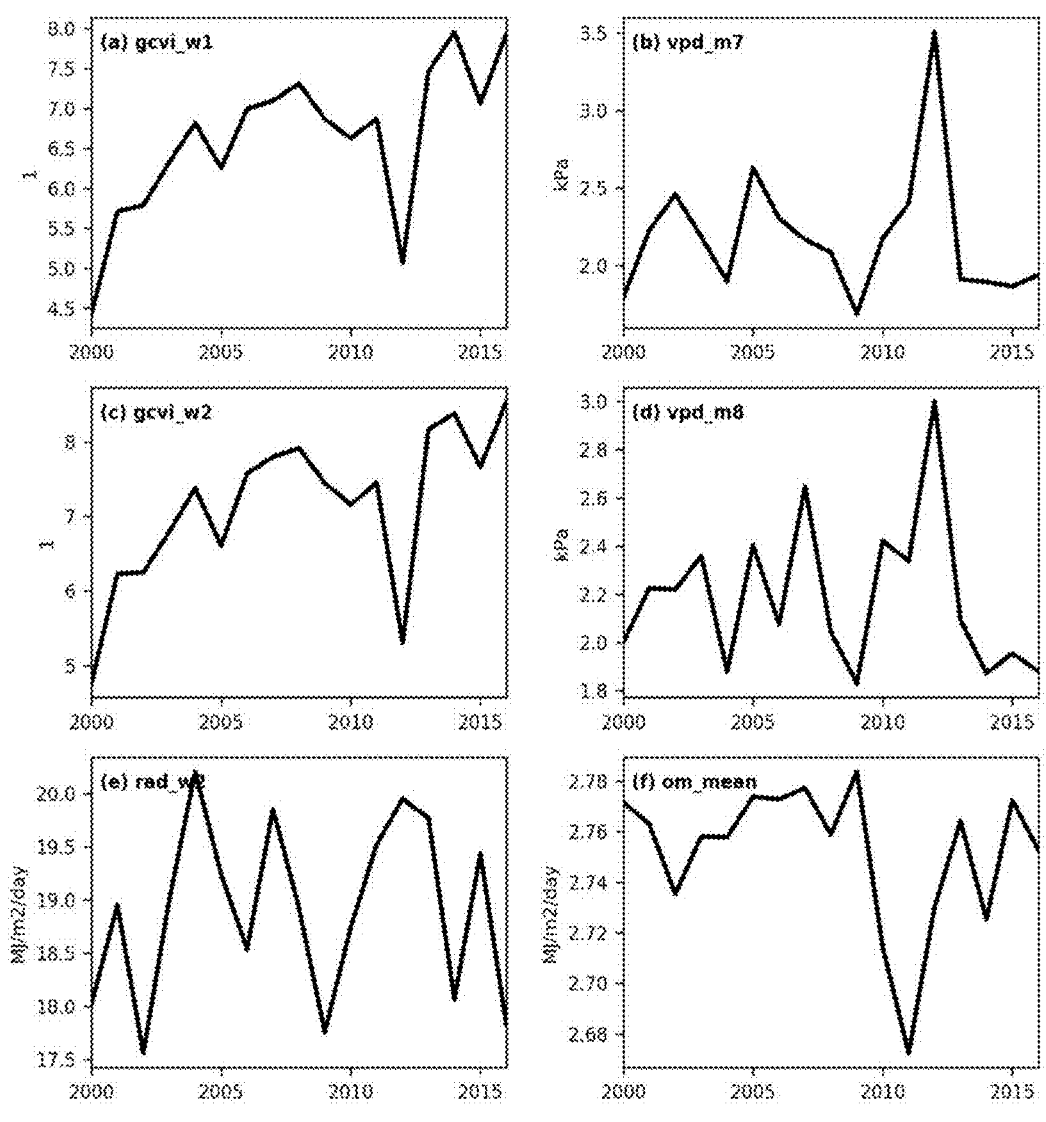
FIG. 18 depicts data obtained according to various embodiments—Interannual variations of county-average key input variables for the predictive model.
Figure 19:
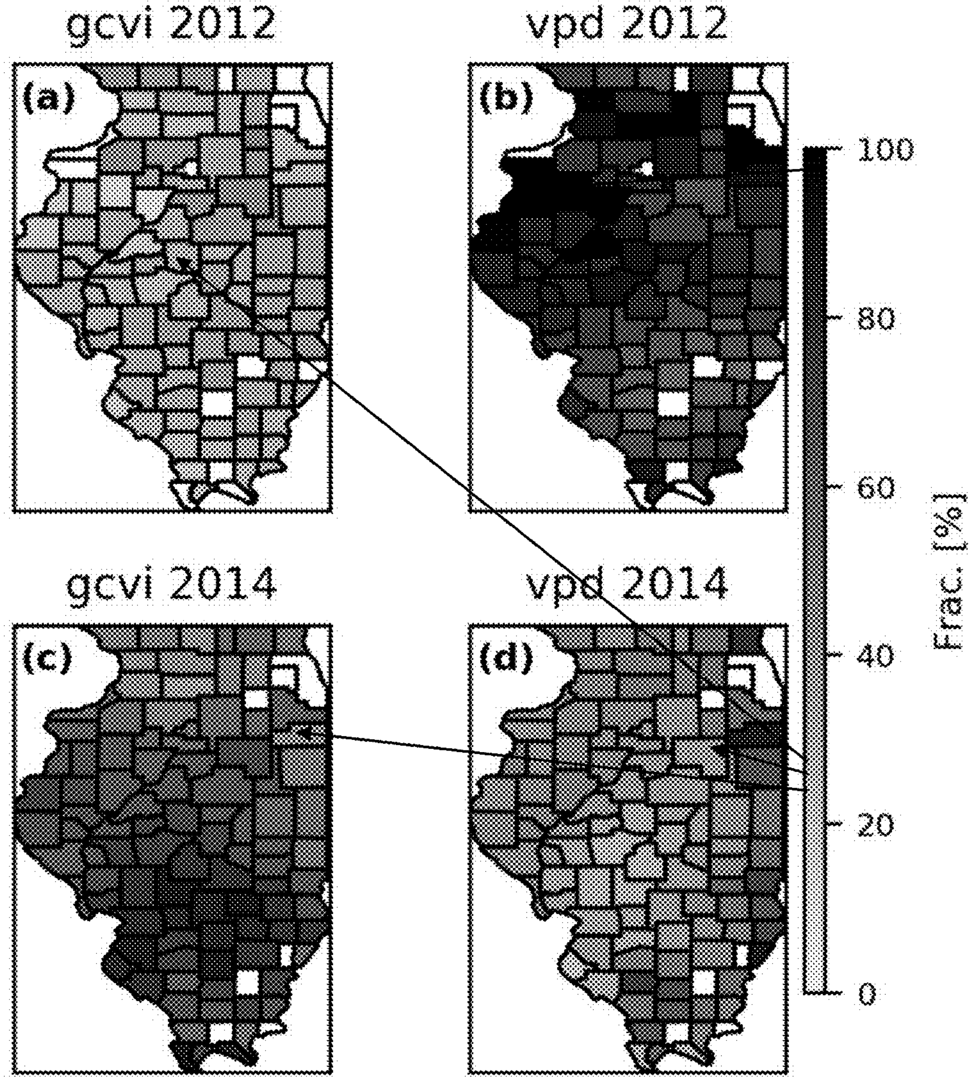
FIG. 19 depicts data obtained according to various embodiments—(a-b) Contribution of GCVI and VPD (month 7 and 8) of the yield anomaly in 2012 from gcpl predictive model, (c-d) Same as (a-b) but for the yield anomaly in 2014.

Still referring to various Results associated with the demonstration example, reference will now be made in particular to Model sensitivity and anomaly year analysis. Since the gcpl model is relatively parsimonious with only 8 input variables and shows great predictive skills and little overfitting effect (see FIGS. 4A-4C), in the following analysis the focus is on this model (i.e., gcpl) and investigates which input variables drive the spatio-temporal variations in the predicted yields based on the gcpl model. To achieve that, extracted were the standardized regression coefficients for the gcpl model using different training years, and then compared were the regression coefficients. FIG. 6A shows that, in the gcpl model, (1) corn yield responds positively to GCVI values in both pheno-window (gcvi_w1, gcvi_w2), positively to incoming solar radiation in the dough phenowindow (rad_w2), and positively to soil organic matter concentration; (2) corn yield responds negatively to VPD in July and August (vpd_m7 and vpd_m8); (3) VPD in July is the most important predictor for corn yield in Illinois. Using these coefficients, quantified then were the contribution of different inputs from biological or climatic factors to modelled yield anomalies. Specifically, selected were the year with the lowest yield (2012) and the year with the highest yield (2014) during the example period. In 2012, the predicted yield anomaly is very close to the observed values with a median value of −4 t/ha (FIG. 6B). In the model, such anomaly is driven by both vegetative and environmental factors with a reduction in GCVI values and increases of VPD in July & August (FIG. 18). Overall, the VPD anomalies contribute to over 70% of the total yield anomaly while the GCVI anomalies contribute to the rest. The partitioning of contribution between vegetative (GCVI) and environmental (VPD) controls also varies in space (FIG. 19), with VPD contributions reaching over 90% in northern Illinois and decreasing to ~60% in the south. In contrast, in year 2014 which shows a positive yield anomaly of ~3 t/ha, the model also predicts a positive anomaly but with only 2 t/ha, which is also mainly driven by changes in GCVI and VPD variables (FIG. 6C). Different from the drought year 2012, GCVI contributes to 40%-80% of the anomaly in the model while VPD variables contribute to 20% to 60% in 2014 (FIG. 19).

Figure 7A:
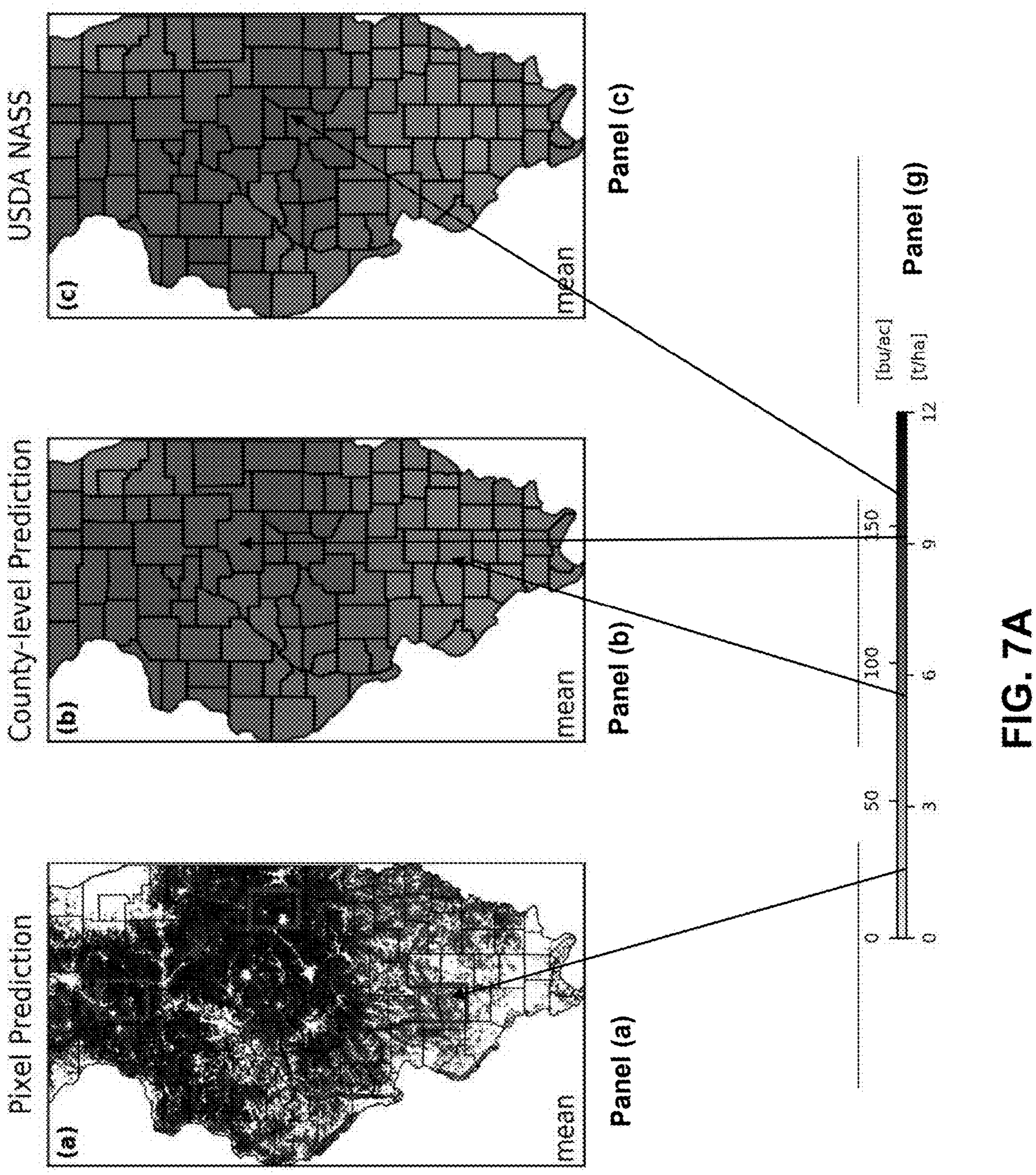
FIGS. 7A-7B depict predicted yield from the gcpl model according to various embodiments. The predicted yield from the gcpl model is across different scales compared with USDA NASS county level data for the state of Illinois. Panels (a), (b), (c) of FIG. 7A are for pixel prediction, county-level prediction and USDA NASS observations of multi-year mean yield, respectively. Panels (d), (e), (f) of FIG. 7B are for pixel prediction, county-level prediction and USDA NASS observations of the yield in 2012, respectively. White areas represent crop fraction<one third. Gray area at county level indicates no NASS data available. Black boxes (see Panels (a), (d) of FIGS. 7A, 7B) indicate three 0.5*0.5 degree zoom-in boxes. Panels (g), (h) of FIGS. 7A, 7B are scales associated with FIGS. 7A-7B.
Figure 7B:
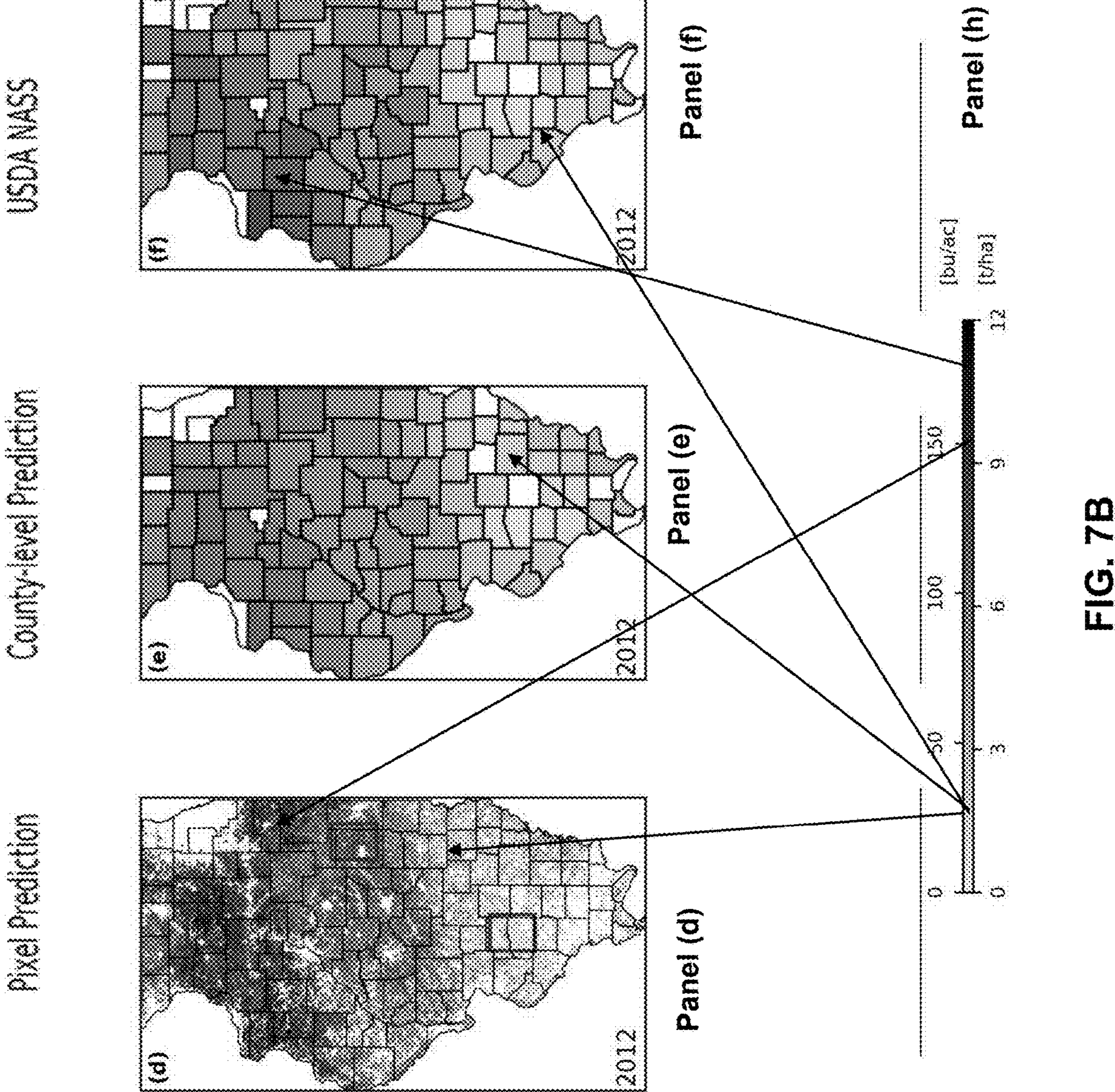
Figure 8A:
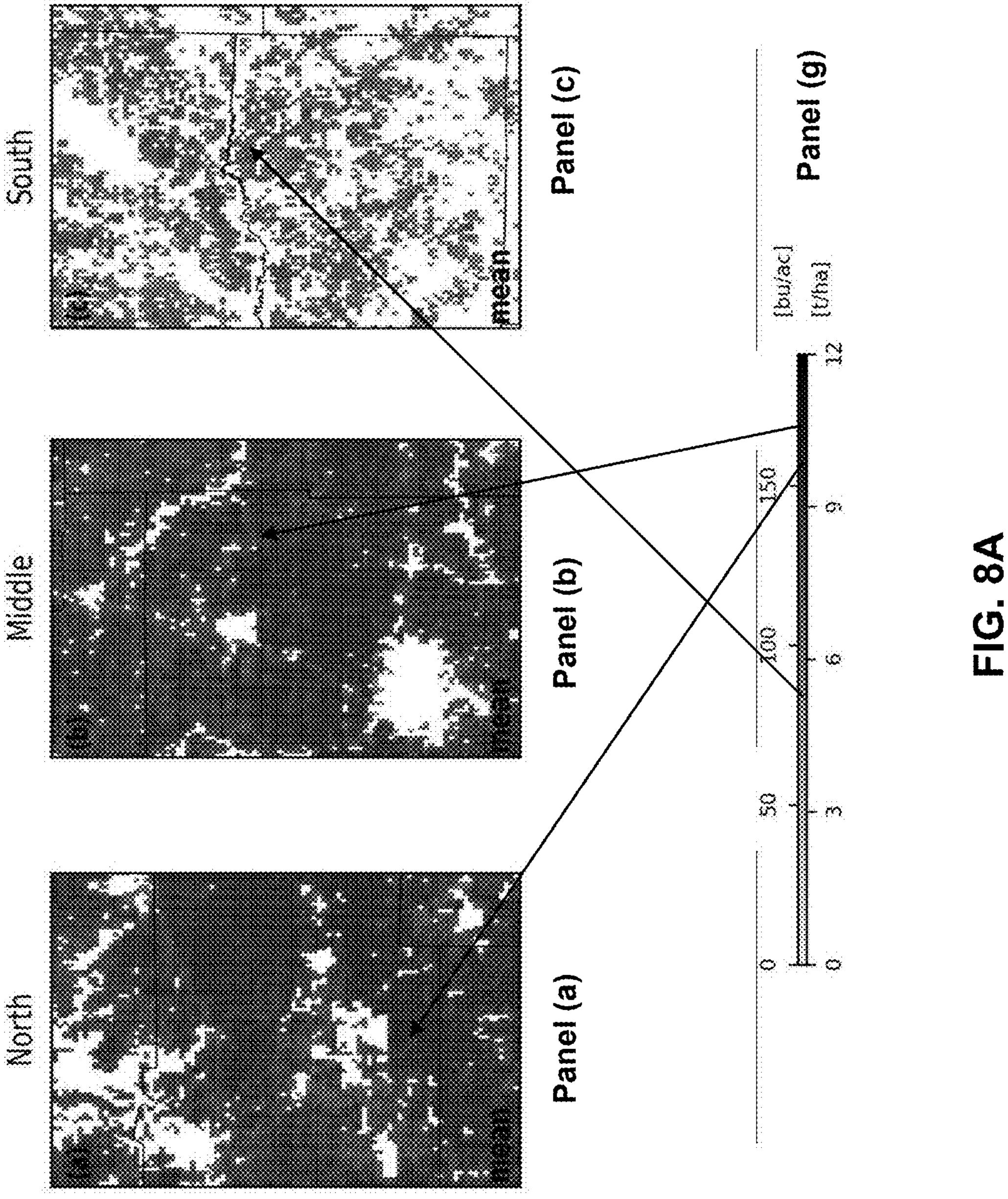
FIGS. 8A-8B depict zoom-in pixel level yield predictions according to various embodiments. The zoom-in pixel level yield predictions are for three 0.5*0.5 degree boxes from north to south Illinois. Panels (a), (b), (c) of FIG. 8A are for the multi-average yields in North, Middle and South, respectively. Panel (g) of FIG. 8A is a respective scale. Panels (d), (e), (f) of FIG. 8B are for yield in 2012 in North, Middle and South, respectively. Panel (h) of FIG. 8B is a respective scale. White area indicates pixels where average (see Panels (a), (b), (c) of FIG. 8A) or year-specific (see Panels (d), (e), (f) of FIG. 8B) corn fraction is less than one third.
Figure 8B:
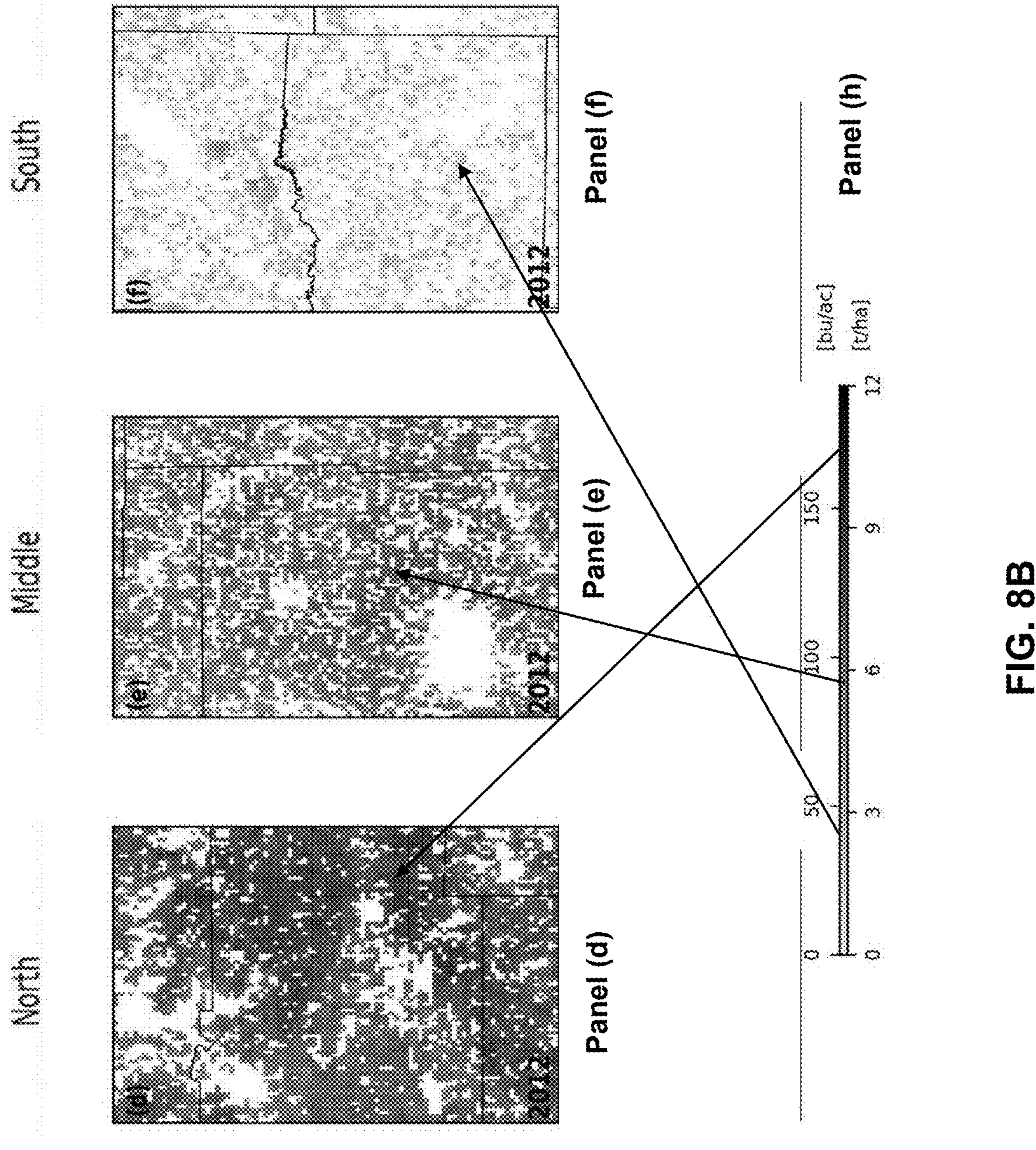

Still referring to various Results associated with the demonstration example, reference will now be made in particular to High-resolution yield mapping and validation. The ASPIRE modeling framework of various embodiments estimates crop yield at the individual pixel level, though the training of the model can be done either at the aggregated regional scale (e.g., at the county level for the whole state of Illinois as in this example), or at the individual field level when geocoded field-scale yield data become available (see FIG. 1). In this example, applied was the finalized gcpl predictive model to all the pixels of the MODIS VI data (i.e., 500 m resolution), and generated were annual corn yield maps for Illinois at 500 m resolution from 2000 to 2016 (see FIGS. 7A-7B and 8A-8B). FIGS. 7A-7B show the yield maps for the multi-year average yield and 2012 drought year yield. The high-resolution yield maps (Panel (a) of FIG. 7A and Panel (d) of FIG. 7B) show more finer-scale heterogeneous feature within a county, with pixel-level yields varying by 3 t/ha or more within a county on average. This large spatial heterogeneity is primarily driven by variations in input satellite VI and climate. When aggregating the pixel-level yield to the county scale (Panel (b) of FIG. 7A and Panel (e) of FIG. 7B, it is found that the county-level prediction from the ASPIRE gcpl model matches well with the USDA NASS observation (Panel (c) of FIG. 7A and Panel (f) of FIG. 7B), because the model was trained at county level as discussed above (see Model Performance Assessment). To further inspect the details of the between-field yield variability within a county, chosen were three regions each with a 0.5*0.5 degree bounding box along the latitudes in the State of Illinois for both multi-year average yield and 2012 drought year yield (FIGS. 8A-8B). For average corn yields, the standard deviation values of the predicted pixel-level yields are all between 0.8-0.9 t/ha in the three regions (Panels (a), (b), (c) of FIG. 8A). In the drought year 2012, the heterogeneity in the predicted pixel-level yields increases (Panel (d) of FIG. 7B) with the standard deviation values increasing to 1.0-1.2 t/ha in the three selected regions (Panels (d), (e), (f) of FIG. 8B). These above results indicate that drought years may induce more within-county yield variability between fields.

Figure 9A:
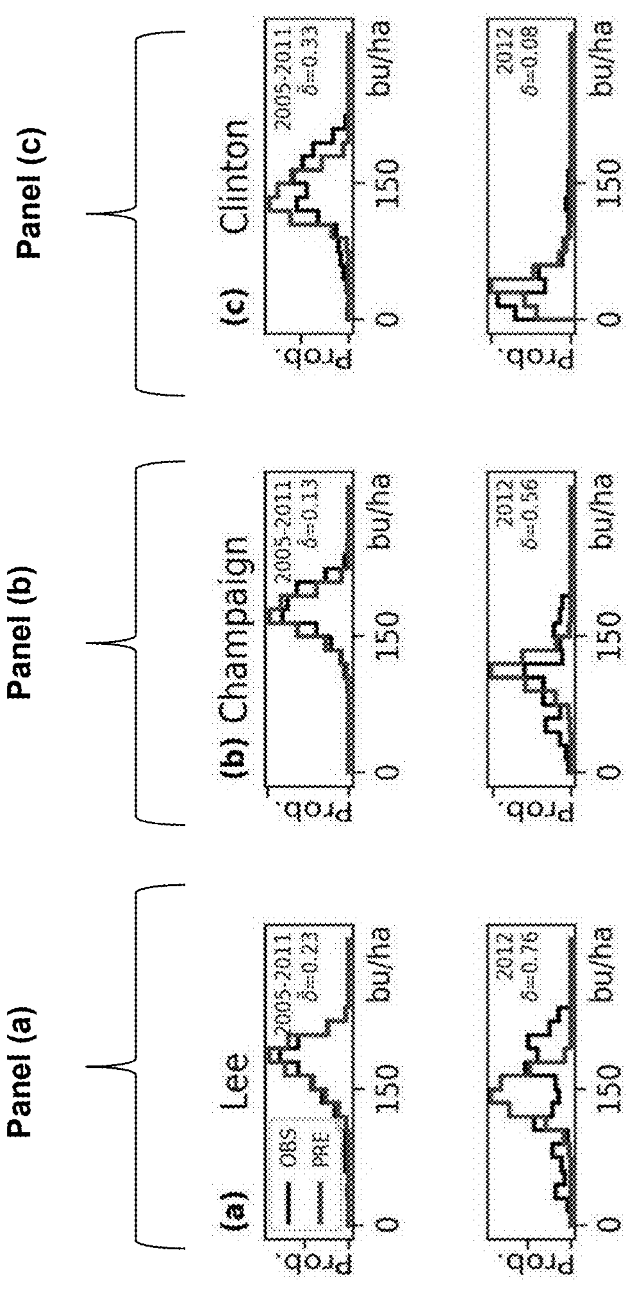
FIGS. 9A-9B depict independent validation of county-level yield distribution according to various embodiments.
Figure 9B:
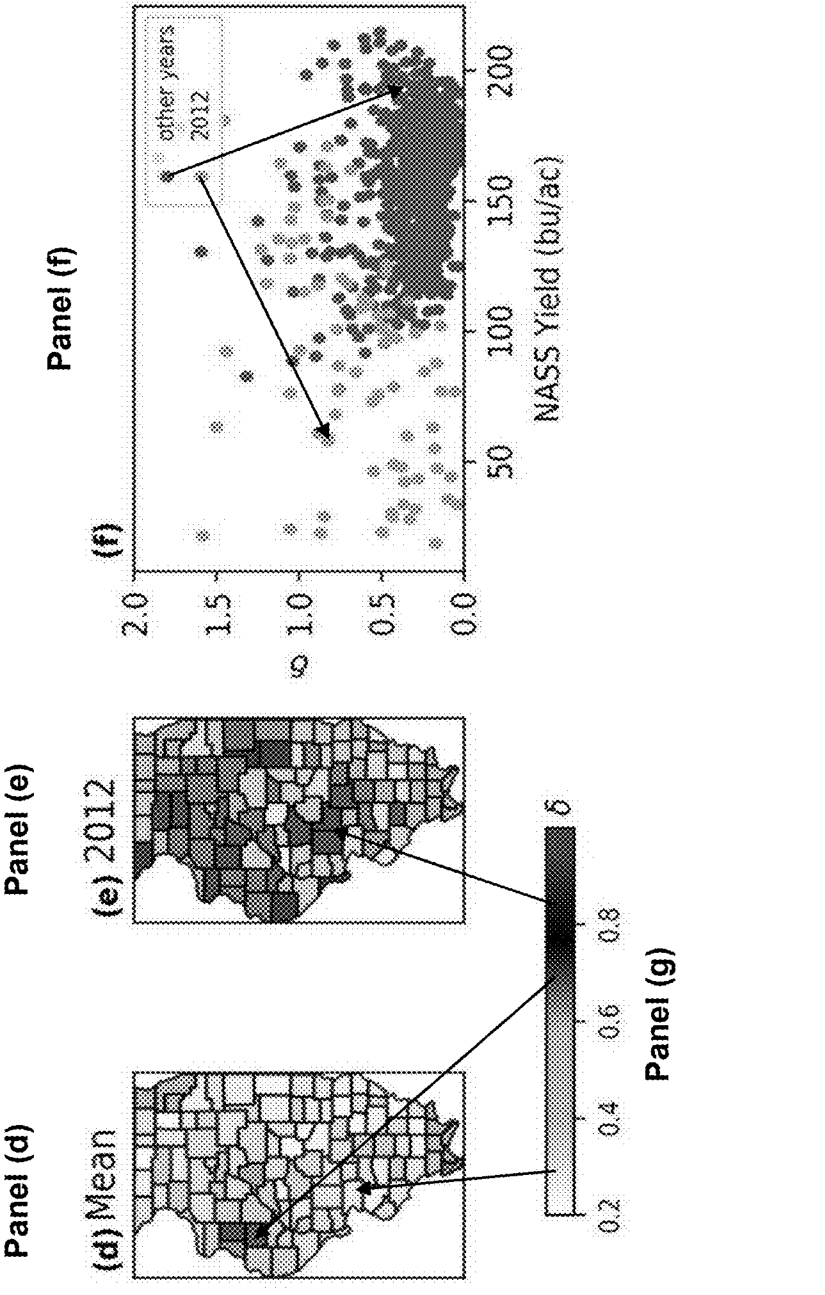

Furthermore, used was an independent field-level yield data from the RMA to test the within-county yield variability. Due to the fact that this independent data provides 100 fields/county/year from 1995 to 2012 for the three states (i.e., Illinois, Iowa, and Indiana) without any geolocation information, it could not be used to exactly validate the field-level yield. Instead, it was assumed that this 100 fields/county/year data can represent the field-level yield distribution, which can then be used to validate the simulated yield distribution for each county. Here again, used was the prediction results from the finalized ASPIRE gcpl model. FIGS. 9A-9B show the difference between the predicted (PRE) and observed (OBS) yield distributions measured by the KL divergence. Panels (a), (b), (c) [each of which includes two graphs] of FIG. 9A show the histograms comparison between the simulated and observed yield distributions for the three counties across Illinois (the same three counties used in FIGS. 7A-7B and 8A-8B). The Panels (d), (e) of FIG. 9B show the spatial pattern of the KL divergence for normal years (2005-2011) and the drought year (2012). It is found that the gcpl predictions for normal years (2005-2011) can satisfactorily capture the observed field-level yield distribution at the county level, but for 2012 the KL divergence increases compared with other years. The three county-level example results show the same pattern that during the normal years good correspondence is achieved between the simulated and observed field-level yield distribution; however, for the 2012 case, though the mean of yield is largely captured by the gcpl results, the predicted distribution is in general narrower and more concentrated than the actual observation. A major reason here is that the current method of this embodiment only uses county-level yield data for training and has not involved any field-level yield data or yield distribution data in the training process. However, given this limitation, the method still can satisfactorily reproduce the normal-year field-level yield distribution, with only lower performance during extreme drought years (e.g., 2012). Other embodiments can incorporate field-level yield data or yield distribution data directly into the ASPIRE model training process to further improve the field-level yield during extreme years.

Finally, Panel (f) of FIG. 9B shows a scatterplot between county-level annual averaged yield and that year's KL divergence measure. The results are largely consistent with the above results that the KL divergence is low during most normal years, but KL divergence is a little higher when yield is low (i.e., in this case the low county-level yield are all from 2012). Another interesting pattern is that, the KL divergence in 2012 has a weak positive relationship with the observed yield, and further investigation finds that for those high-productivity counties there is usually a long and heavy tail in the yield distribution from some low yield fields, and the current method of this embodiment is not able to capture such a heavy tail due to the lack of training data.

Reference will now be made to certain Discussion associated with the demonstration example. In particular, reference will now be made to Assessments of the ASPIRE framework. Various results show that the ASPIRE framework can achieve a high performance in predicting corn yield from field to county scales. The ASPIRE framework is flexible and can work at any locations where satellite VI and climate data are available. In an embodiment, this framework calculates yield at the smallest spatial scale (e.g., pixel level, or field level), and then aggregates yield to the regional scale for training and optimizing the model parameters. Such a framework allows for using yield data at any scales in the training process, e.g., regional-aggregated yield data, field-level yield data, or a field-level yield distribution for a region. Such a configuration allows the yield prediction algorithm to be flexibly adjusted to input and training data (FIG. 1).

The best ASPIRE model performance (i.e., gcpl) is comparable to the most advanced model SCYM based on SCYM's reported performance (Jin et al., 2017). The prediction of gcpl can capture spatio-temporal variabilities of yield, including the year with the extreme events, e.g., 2012 drought year. The best model gcpl is also parsimonious with only 6 predictors, and shows little overfitting in its predictions. Thus, this work demonstrates that without the use of a process-based crop model, a high-performance yield prediction can also be achieved.

The ASPIRE framework shows great potential to estimate field-level crop yield. In this example, validated was ASPIRE's field-level yield prediction indirectly through comparing the predicted field-level yield distribution and the observed sample distribution from RMA at the county level (see FIGS. 9A-9B). The comparison results show that the ASPIRE can nicely capture the field-level yield distributions for normal years. However, the predicted yield has a narrower yield distribution during the 2012 drought year than the observed yield distribution, though the mean county yield has been much better predicted. It is believed that this is the first time that such a comparison has been done, and given the current training data is only from the county-level aggregated yield, the achieved results by ASPIRE are promising. Explicitly including the county-level yield distribution or simply the field-level yield data into the training of the ASPIRE framework is expected to improve the ability to capture extreme year's yield variability.

Still referring to certain Discussion associated with the demonstration example, reference will now be made in particular to Benefits of explicit phenology information for crop yield prediction. In this work specifically tested were the benefits of adding satellite-derived phenology information into the ASPIRE framework for yield prediction. The earlier literature shows the importance of crop phenology (Barlow et al. 2015; Gourdji et al. 2013; Rattalino Edreira et al. 2014; Wilhelm et al. 1999). In addition, there are observed large spatial variations of crop phenology (see FIG. 2). It is found that the gcpl model (including the phenology window for climate variables) has a better performance than the gcfl model (using the fixed window for climate variables), though the margins are small at the regions where the identified phenology window and the fixed climate window cover similar time periods. However, for regions where the phenology window and the fixed climate window differ, gcpl shows more robust performance in predicting corn yield, demonstrating a better scalable of the ASPIRE framework when the phenology is explicitly considered in the prediction algorithm.

It is worth noting that the conventional approach of estimating crop pheno-stages from satellite data (e.g. Zhang X, Friedl M A, Schaaf C B, Strahler A H, Hodges J C F, Gao F, Reed B C and Huete A 2003 Monitoring vegetation phenology using MODIS Remote Sens. Environ. 84 471-5) is simple and has large space for improvement. Specifically, pheno-stage estimation according to various embodiments is primarily based on the date of maximum GCVI value. More sophisticated approaches, e.g., curve fitting (Guan et al. 2014; Sakamoto et al. 2013; Sakamoto et al. 2005), can be used in other embodiments. In addition, the estimation of crop pheno-stages from satellite data is conventionally constrained by the lack of ground truth at finer spatial resolutions. The current example described herein uses the available public data from USDA weekly crop progress report, but it is offered only at the agricultural district level and state level. Finer spatial ground truth data will improve the estimation. Furthermore, other satellite data beyond the VIs (based on the visible and NIR), such as solar-induced fluorescence (Frankenberg and Berry, 2017; Guan et al., 2015), may provide better indicator of crop phenology information (Joiner et al., 2014; Urban et al., 2018), which may also be worth implementing when finer resolution data at those spectral bands become available. Finally, in the current example described herein used were only the pheno-stages around the flower stage (i.e., silking and dough). Whether including more pheno-stages (e.g., time of sowing) can further improve the yield prediction remains unexplored by the current example described herein.

Figure 20:
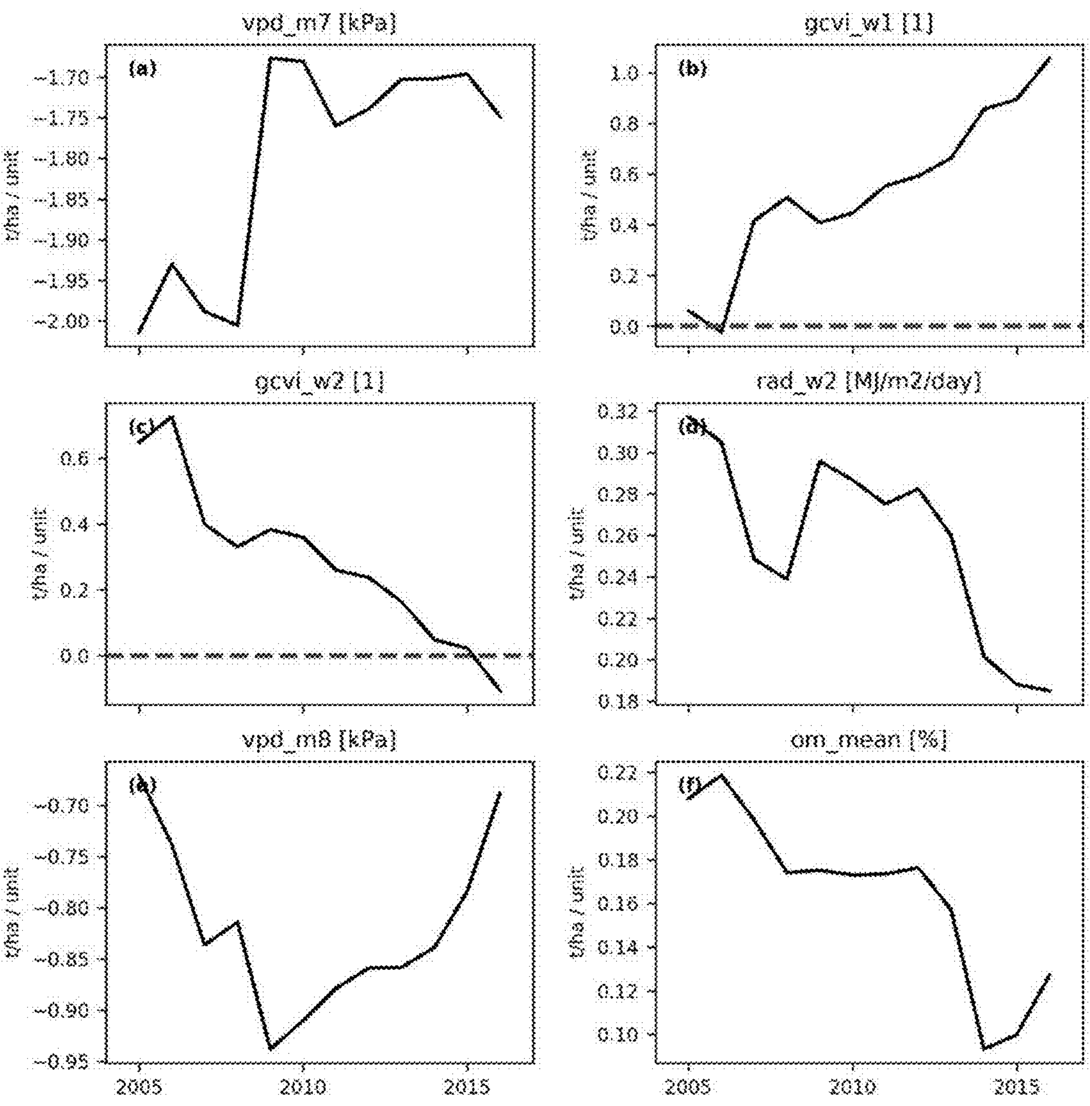
FIG. 20 depicts data obtained according to various embodiments—Changes of absolute regression coefficients with the end year of training data set for gcpl model.
Figure 21:
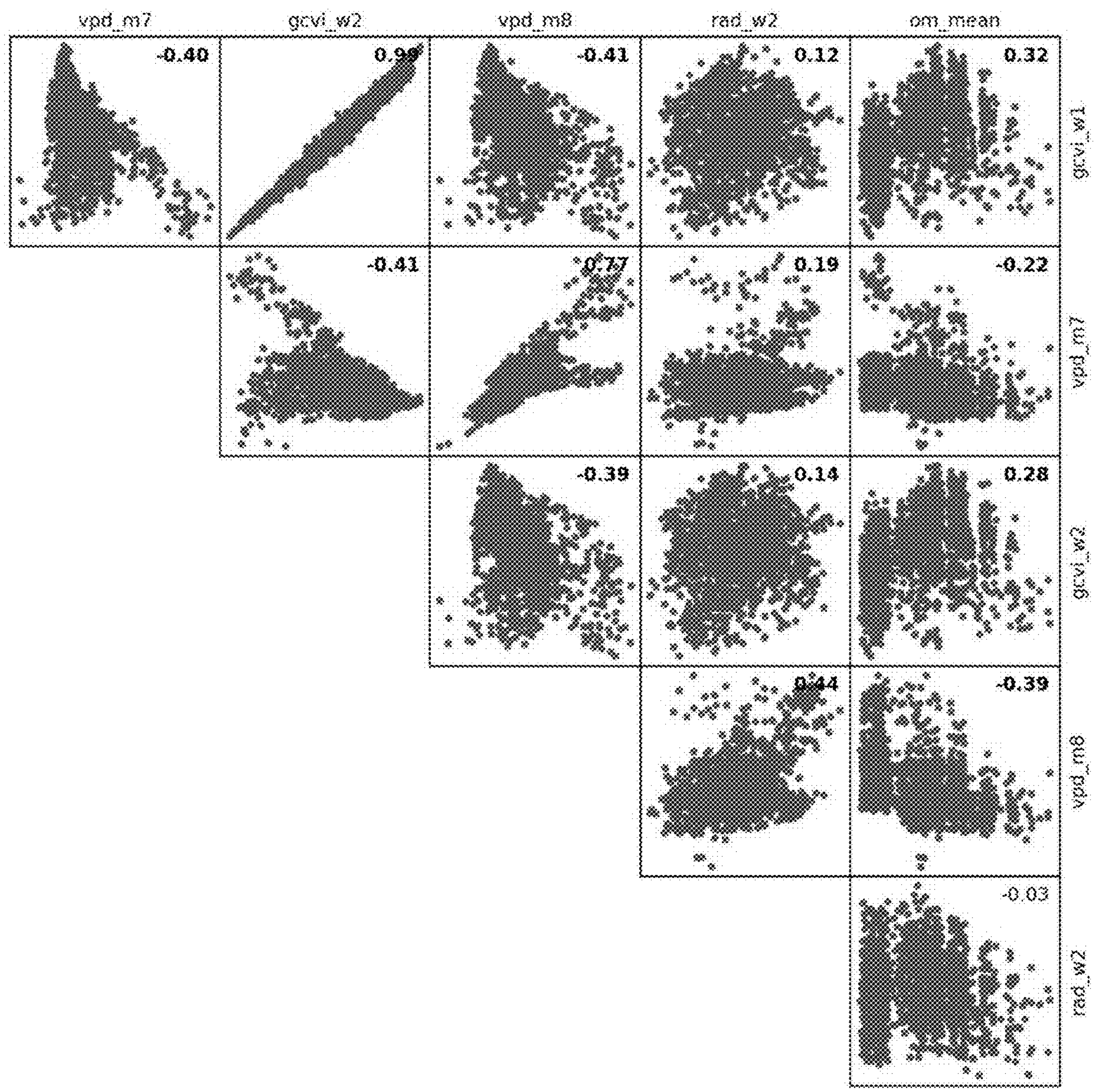
FIG. 21 depicts data obtained according to various embodiments—Correlation among input variables for gcpl model. Pearson's r is shown for each panel. Significant correlations are shown in bold.
Figure 22:
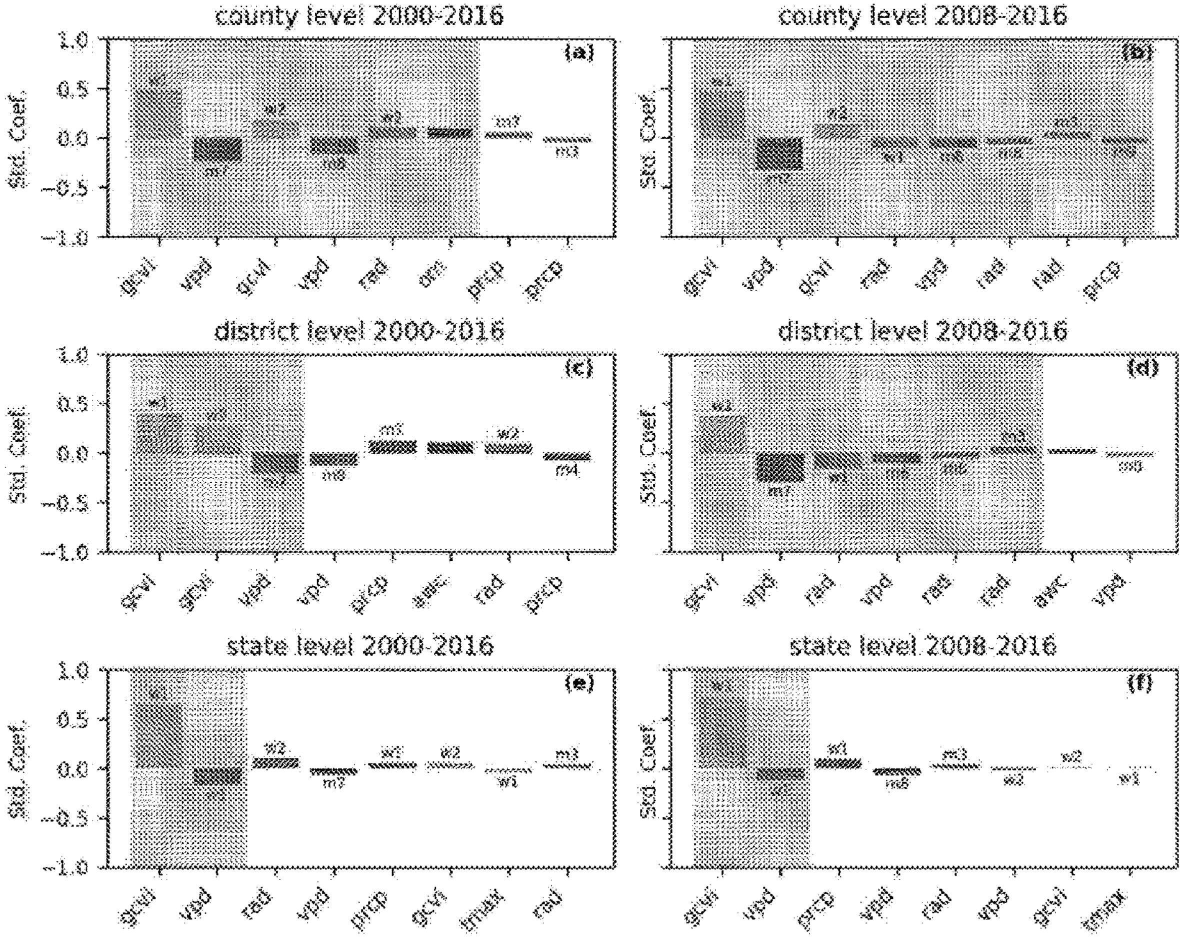
FIG. 22 depicts dependence of gcpl model structure on crop yield data availability according to various embodiments. Each panel shows the resultant standardized coefficient for a given data availability scenario. Shading and labels are defined the same way as FIG. 3A. Shading shows the final selected variables. Note that the county-level 2000-2016 scenario is the same as the analysis presented herein. Since the LASSO regression tends to select fewer variables when data point number is smaller, the variable selection frequency threshold is reduced here from 75% to 50% for state-level analysis.
Figure 23:
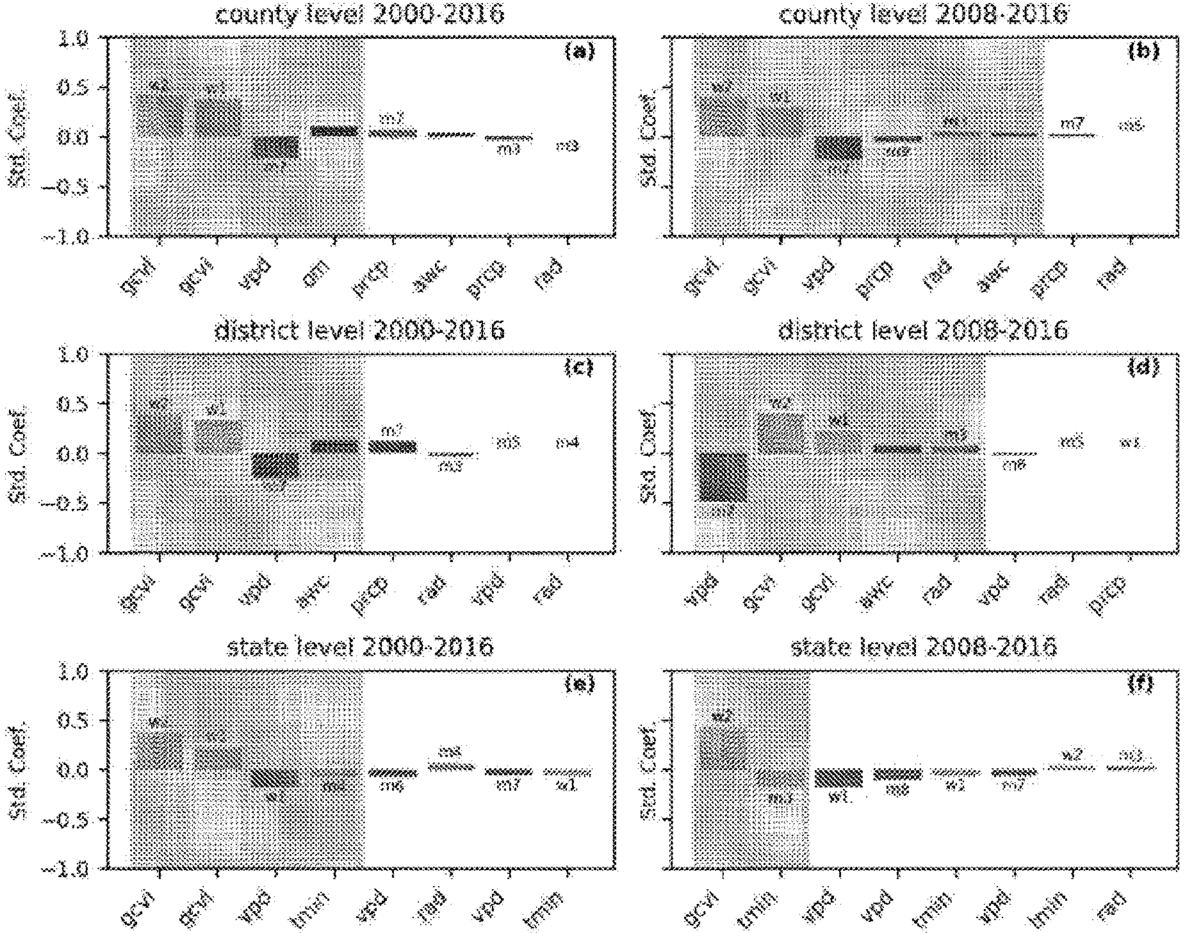
FIG. 23 depicts dependence of gcfl model structure on crop yield data availability according to various embodiments. Each panel shows the resultant standardized coefficient for a given data availability scenario. Shading and labels are defined the same way as FIG. 3B. Shading shows the final selected variables. Note that the county-level 2000-2016 scenario is the same as the analysis presented herein. Since the LASSO regression tends to select fewer variables when data point number is smaller, the variable selection frequency threshold is reduced here from 75% to 50% for state-level analysis.
Figure 24:
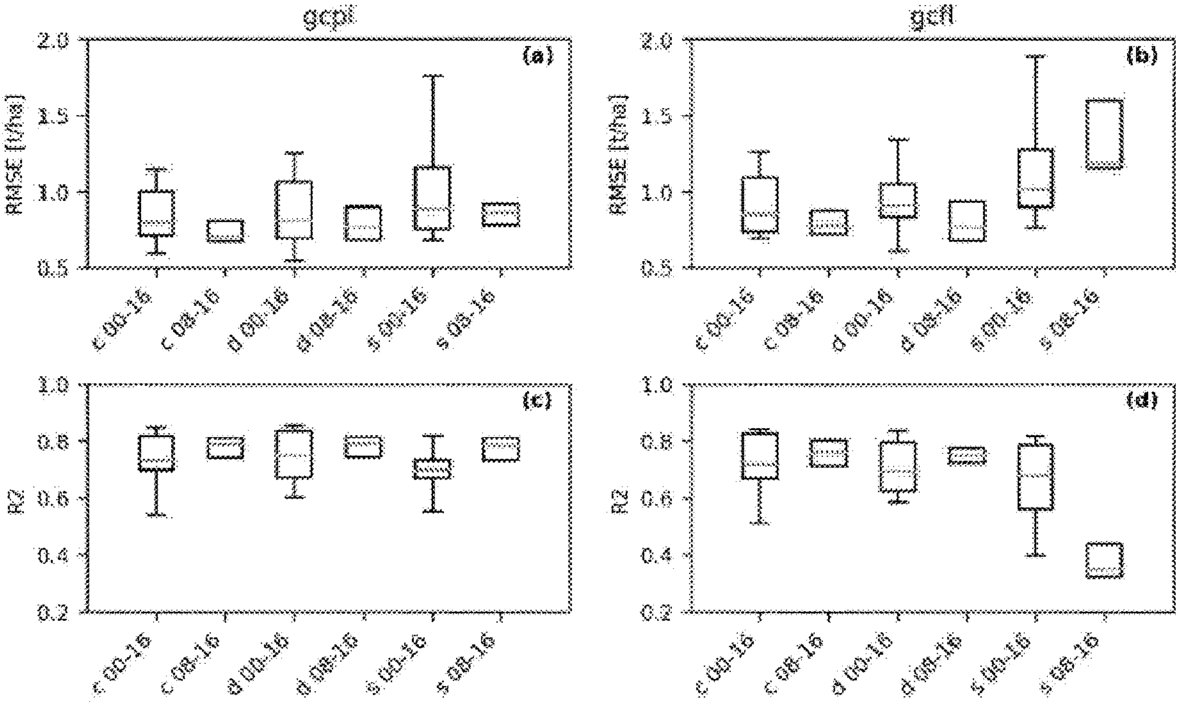
FIG. 24 depicts dependence of predictive skills (RMSE and R2) of the best gcpl and gcfl models on data availability according to various embodiments. In the x labels, 'c' means county level, 'd' means agro-district level, and 's' means state level while the numbers indicate the temporal range of the data. Each box plot shows the distribution of predictive skills over different years within the study periods in the same way as respective ones of FIGS. 3C-3F.

Still referring to certain Discussion associated with the demonstration example, reference will now be made in particular to Sensitivity of yield to biotic and abiotic variables. One advantage of the current ASPIRE framework according to various embodiments is that it automatically selects the most useful predictors (see FIGS. 3A-3F) and also provides each predictor's contribution for the yield estimation (see FIGS. 6A-6C), due to the use of LASSO. We find that atmospheric water stress (represented by VPD) during late growing season (July to August) has the largest contribution to spatio-temporal variations of crop yields in Illinois, followed by aboveground biomass during flowering period approximated from satellite GCVI. Although the sensitivity of yields to input variables in gcpl varies with the number of training years, the only notable change is that the importance of silking GCVI (gcvi_w1) increases while the importance of dough GCVI (gcvi_w2) decreases to around zero (FIG. 20), probably due to collinearity among input variables (FIG. 21), while the sensitivity to GCVI and water stress is generally stable and thus trust-worthy. Aside from water stress and peak biomass, radiation during the dough pheno-stage and soil organic matter contents have positive effects on crop yields, probably driven by the crop demand of light and nutrient especially during grain-filling stages. Nevertheless, their overall contributions to yield variations are relatively small (FIGS. 6A-C). The results described herein suggest that peak season around corn's flower stage, which corresponds to July and August in the US Corn Belt, is the most critical period to determine yield, as the selected biomass and weather variables are mostly from this period. These results are largely consistent with the earlier work (Rattalino Edreira et al. 2014; Wilhelm et al. 1999), showing that the peak season is when peak LAI is achieved, and also when part of Harvest Index (related to the grain number processes) is determined. Finally, the quantitative interpretation of the model sensitivity should be cautious, especially when projecting long-term changes in crop yields under climate change. The current gcpl model only considers linear effects while yield responses to biomass and climatic stress can be non-linear. In addition, changes in crop hybrid, $CO_2$ concentration, human management, etc. can potentially change the sensitivity values.

Reference will now be made to a discussion of certain functionalities that have been implemented according to various embodiments. In particular, according to various embodiments the following aspects of the ASPIRE framework have also been implemented:

First, the trained model assumes that each pixel (or each crop field) in the example region follows the same model (here so-called a "global model"), i.e., corn grown at different locations have the same response functions with climate and soil properties. This assumption is generally valid, and an improvement has been implemented by building region-specific models to address unique local features (e.g., crop varieties maturity groups, or shared regional management practices), or building some forms of hieratical models that combine the global model with localized model (Mathieu and Aires, 2016).

Second, for the current example, used only was LASSO, which has the ability to automatically select useful variables, but still is a linear model which cannot capture nonlinear responses. The ASPIRE framework allows the use of various empirical modeling approaches, and the current framework makes it easy to implement all sorts of advanced machine learning approaches. It is envisioned that the modeling performance can be further improved with the use of more advanced approaches. Meanwhile, due to the use of data-driven approaches (e.g., machine learning), this method can be applied to different types of row crops.

Third, though the current example used the county-level yield data for the training, the ASPIRE framework allows the incorporation of field-level yield data, or regional-scale field-level yield distribution in its training process (dashed lines in FIG. 1). It is envisioned that the inclusion of some forms of field-level data can further constrain the predictive model and improve model performance especially at the field level during extreme event conditions.

Fourth, though in the current framework biotic stress was not explicitly modeled, the inclusion of satellite vegetation data carries some of that information implicitly. As the rich amount of satellite data become available with more spectral bands (e.g., visible, near-infrared, fluorescence, thermal, microwave) (Guan et al., 2017), various embodiments of ASPIRE can then take advantage of these satellite data to further improve its performance. Guan et al. (2017) suggested two major contributions of satellite data for crop yield prediction: one is as the proxy of aboveground canopy biomass, which has been largely reflected in the GCVI that was used here; the other is the information of environmental stress (including their effects on Harvest Index and biotic stress) which in many cases could not be captured by the climate variables. Thus, including multi-sensor information should be able to further capture both biotic and abiotic stresses. However, challenges remain, as unlike the vegetation indices that have relatively high resolutions in both space and time, most satellite data at other spectral bands are constrained by the tradeoff of spatial resolution and temporal resolution, which makes the field-level yield estimation difficult.

Finally, one improvement according to an embodiment is to substitute satellite data with finer spatial resolution and daily frequency, such that generation is possible of field-level yield estimation at 30 meter or even higher resolution (3-10 meters). A recent innovation developed by Luo et al. (2018) allows the automatic generation of 30 meter, daily, cloud-free and gap-free satellite fusion data at large scale by combining MODIS and Landsat surface reflectance, and the algorithm (so called "STAIR") can also integrate Sentinel-2 data (10 meter) and Planet Lab's data (3-5 meter) in the fusion data. This provides a true opportunity of mapping out crop yields at field level.

Reference will now be made to Table 2, below (related to principal components analysis over all the predictor variables in certain analyses discussed herein; all variables in this table are at county-level and are normalized: variables selected by the final gcpl and gcfl models according to various embodiments are bolded in this table).

TABLE 2

| PCA1 (28.2%) Water + temperature | | PCA2 (11.5%) Temperature + water | | PCA3 (7.9%) Radiation | | PCA4 (6.8%) Biomass 1 | | PCA5 (6.3%) Biomass 2 | |
|---|---|---|---|---|---|---|---|---|---|
| Vars | loading | vars | loading | vars | loading | vars | loading | vars | loading |
| tmax_m7 | −0.207 | tmin_m6 | −0.247 | rad_w2_fix | −0.358 | **gcvi_w1_fix** | **−0.325** | prcp_m4 | 0.282 |
| **vpd_m8** | **−0.206** | tmin_m9 | −0.245 | prcp_w2_fix | 0.323 | rad_w2 | −0.270 | **gcvi_w2_fix** | **0.245** |
| tmax_w2 | −0.206 | prcp_m7 | −0.215 | rad_m8 | −0.311 | vpd_m5 | −0.262 | rad_m9 | −0.226 |
| tmax_m8 | −0.203 | tmin_m8 | −0.213 | prcp_m8 | 0.295 | tmax_m5 | −0.261 | rad_m6 | −0.211 |
| vpd_w2 | −0.201 | tmin_w2_fix | −0.201 | rad_m5 | 0.265 | vpd_m9 | −0.230 | **gcvi_w1** | **0.210** |
| tmax_w1_fix | −0.194 | rad_m7 | 0.200 | prcp_w2 | 0.241 | rad_w1 | −0.229 | tmax_m3 | −0.210 |
| tmin_m7 | −0.189 | rad_w1 | 0.196 | prcp_m5 | −0.217 | **gcvi_w2** | **−0.213** | **gcvi_w2** | **0.210** |
| **vpd_m7** | **−0.189** | tmax_m9 | −0.184 | vpd_w2_fix | −0.199 | **gcvi_w1** | **−0.210** | Year | 0.209 |
| tmax_w1 | −0.188 | prcp_w1 | −0.182 | vpd_m6 | 0.184 | tmax_m9 | −0.208 | vpd_m3 | −0.203 |
| vpd_w1 | −0.183 | vpd_w1_fix | 0.181 | **rad_w2** | **−0.179** | rad_m7 | −0.196 | prcp_m8 | −0.196 |
| vpd_w1_fix | −0.181 | tmax_m6 | −0.161 | prcp_m6 | −0.166 | tmin_m5 | −0.194 | rad_m4 | −0.194 |
| vpd_m6 | −0.175 | rad_w1_fix | 0.160 | rad_w1_fix | 0.165 | tmin_w1 | 0.180 | tmin_m3 | −0.190 |
| tmin_w1_fix | −0.172 | **vpd_m7** | **0.160** | tmin_m5 | −0.161 | Year | −0.162 | tmin_m6 | 0.180 |
| tmax_m4 | −0.170 | prcp_m3 | −0.153 | vpd_w1 | 0.134 | tmax_w1 | 0.157 | tmin_m5 | −0.157 |
| tmin_m4 | −0.169 | prcp_w2 | −0.151 | prcp_w1_fix | −0.125 | rad_m9 | −0.153 | tmax_m5 | −0.153 |
| tmax_m3 | −0.166 | **om_mean** | **0.147** | vpd_w1_fix | 0.125 | tmin_m7 | 0.151 | prcp_m6 | 0.151 |
| tmin_m3 | −0.166 | vpd_w1 | 0.144 | **om_mean** | **0.116** | prcp_m5 | 0.149 | tmin_w1 | 0.150 |
| tmax_m6 | −0.166 | rad_m5 | 0.143 | **gcvi_w1_fix** | **0.113** | prcp_w2 | 0.148 | prcp_m9 | 0.144 |
| tmin_w2 | −0.164 | tmin_w1 | −0.142 | **vpd_m7** | **0.112** | prcp_m9 | 0.138 | rad_w1_fix | 0.142 |
| vpd_w2_fix | −0.159 | tmin_m4 | −0.142 | tmax_m6 | 0.107 | tmin_w1_fix | 0.125 | tmax_w1 | 0.141 |

Figure 10:
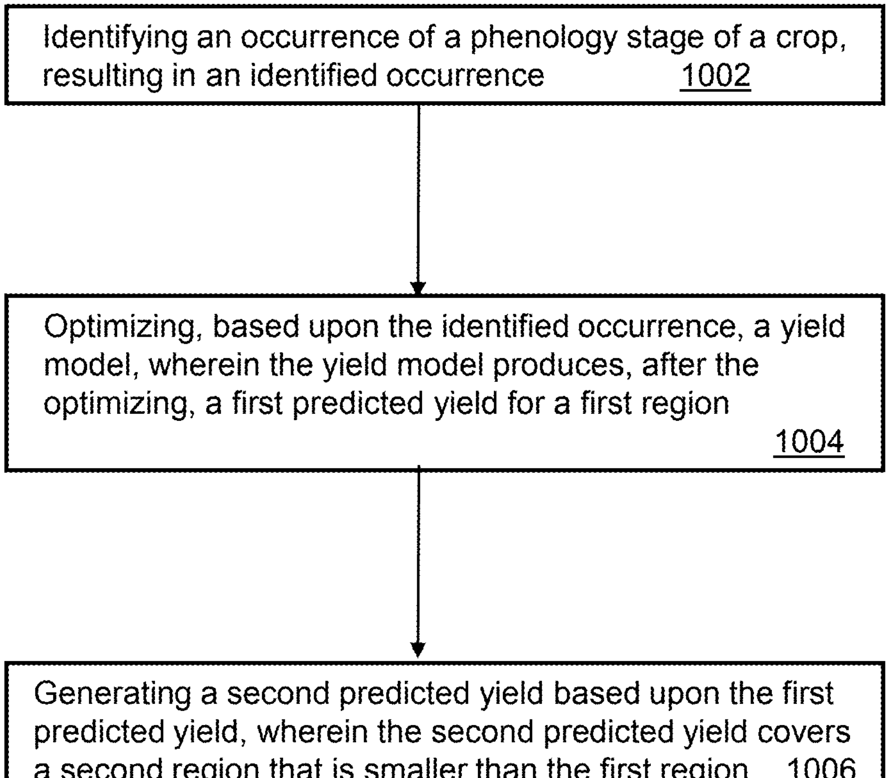
FIG. 10 depicts a method according to an embodiment.

Referring now to FIG. 10, various steps of a method 1000 according to an embodiment are shown. As seen in this FIG. 10, step 1002 comprises identifying an occurrence of a phenology stage of a crop, resulting in an identified occurrence. Next, step 1004 comprises optimizing, based upon the identified occurrence, a yield model, wherein the yield model produces, after the optimizing, a first predicted yield for a first region. Next, step 1006 comprises generating a second predicted yield based upon the first predicted yield, wherein the second predicted yield covers a second region that is smaller than the first region.

Figure 11:
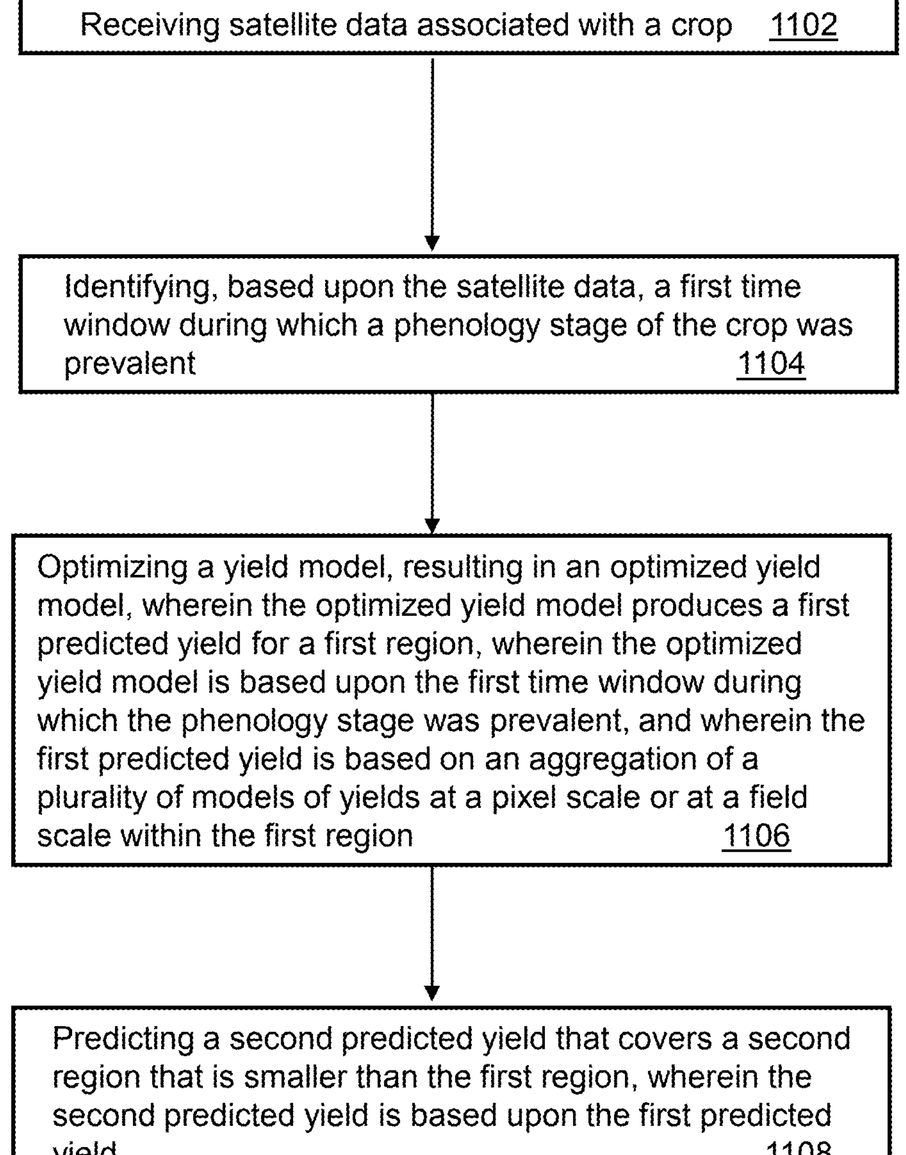
FIG. 11 depicts a method according to an embodiment.

Referring now to FIG. 11I, various steps of a method 1100 according to an embodiment are shown. As seen in this FIG. 11I, step 1102 comprises receiving satellite data associated with a crop. Next, step 1104 comprises identifying, based upon the satellite data, a first time window during which a phenology stage of the crop was prevalent. Next, step 1106 comprises optimizing a yield model, resulting in an optimized yield model, wherein the optimized yield model produces a first predicted yield for a first region, wherein the optimized yield model is based upon the first time window during which the phenology stage was prevalent, and wherein the first predicted yield is based on an aggregation of a plurality of models of yields at a pixel scale or at a field scale within the first region. Next, step 1108 comprises predicting a second predicted yield that covers a second region that is smaller than the first region, wherein the second predicted yield is based upon the first predicted yield.

Figure 12:
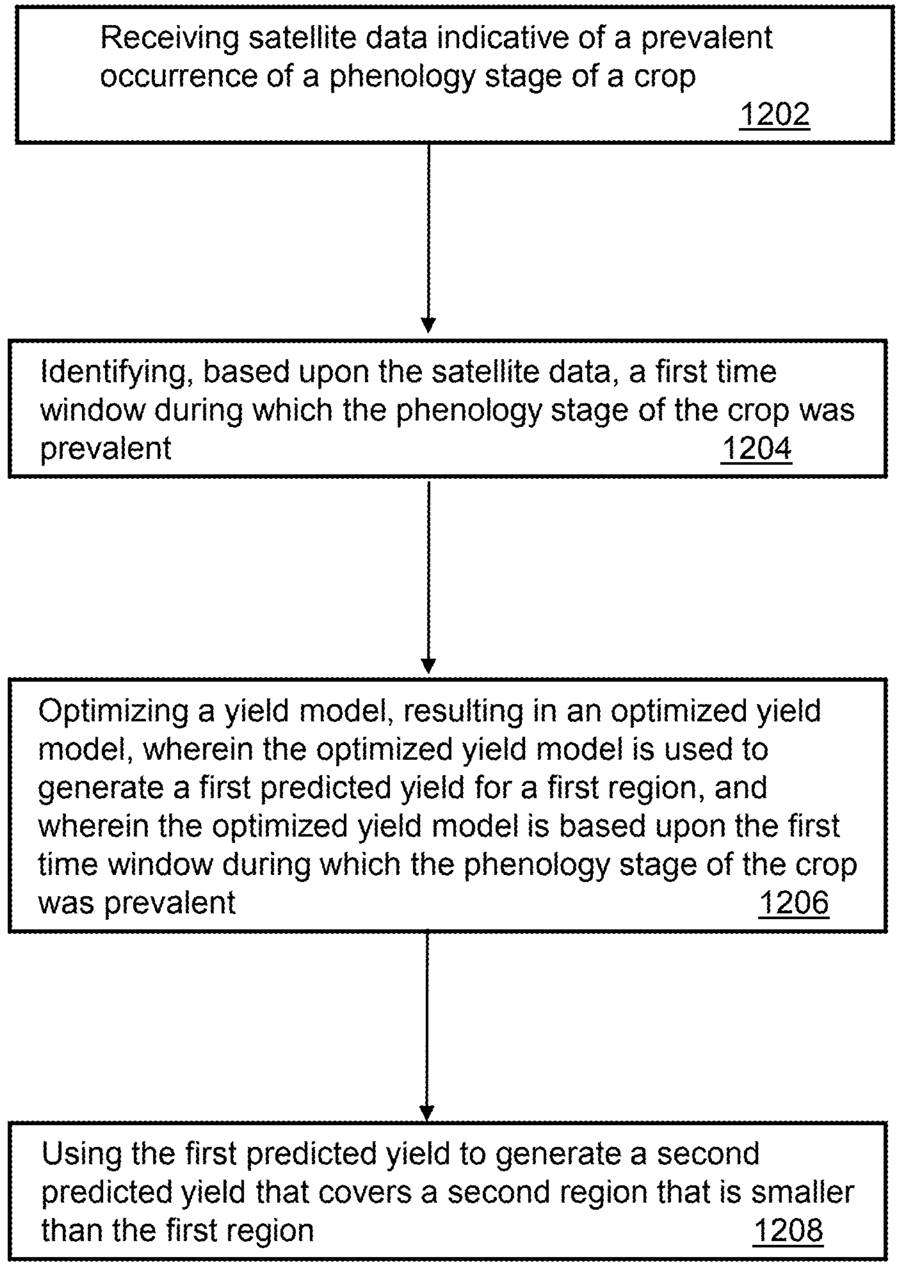
FIG. 12 depicts a method according to an embodiment.

Referring now to FIG. 12, various steps of a method 1200 according to an embodiment are shown. As seen in this FIG. 12, step 1202 comprises receiving satellite data indicative of a prevalent occurrence of a phenology stage of a crop. Next, step 1204 comprises identifying, based upon the satellite data, a first time window during which the phenology stage of the crop was prevalent. Next, step 1206 comprises optimizing a yield model, resulting in an optimized yield model, wherein the optimized yield model is used to generate a first predicted yield for a first region, and wherein the optimized yield model is based upon the first time window during which the phenology stage of the crop was prevalent. Next, step 1208 comprises using the first predicted yield to generate a second predicted yield that covers a second region that is smaller than the first region.

As described herein, various embodiments provide a multi-scale, machine-learning and data-driven (e.g., entirely data-driven) predictive framework for crop yield.

As described herein, various embodiments provide mechanisms for taking aggregate crop yield data and generating individual field predictions.

As described herein, various embodiments provide algorithms for taking various data and producing crop yield estimates.

As described herein, various embodiments provide for crop yield modeling and/or satellite modeling of crop yield.

As described herein, various embodiments provide an ASPIRE algorithm to estimate crop yield across scales (from the field level to continental scales) by using machine learning and various available data.

As described herein, various embodiments can provide accurate and timely estimation of the spatio-temporal variations in crop yield, which in turn can provide valuable information in various aspects related to food security, risk management, and environmental sustainability. For example, crop yield information at fine spatial resolutions (e.g., field-level) can be useful to support decision-making for farmer communities and agricultural industry.

In one example, various algorithms described herein can be implemented in the Python computer language. In another example, various embodiments described herein can run on one or more CPUs. In another example, various embodiments described herein can run on one or more GPUs. In another example, various embodiments described herein can run on one or more computers in a parallelized manner.

As described herein, various embodiments provide a novel data-driven scalable predictive framework called ASPIRE that can (1) integrate various observations (e.g. climate, soil, satellite data) across different scales, (2) include satellite-derived crop phenology information, and (3) select effective predictors using an ensemble of LASSO regressions. An evaluation of the framework of an embodiment to predict corn yields in the State of Illinois from 2000 to 2016 is made. Results show that, with only a few years of training data, ASPIRE according to various embodiments shows little overfitting and can achieve high predictive skills comparable with and even slightly better than certain conventional approaches. This high performance of ASPIRE according to such embodiments benefits from both the incorporation of crop phenology and the machine-learning variable selection. Sensitivity analysis of the resultant predictive model implies that atmospheric dryness (i.e. Vapor Pressure Deficit, VPD) during peak season (July to August) outweighs peak vegetative biomass in predicting the spatio-temporal variations of corn yields in Illinois. In particular, the contribution from water stress to yield anomaly in the 2012 drought can reach ~60%. Finally, according to various embodiments, the ASPIRE model shows good scalability, as even though the ASPIRE implementation discussed in depth herein was only trained using the county-scale data, it is largely successful in capturing field level yield variations. ASPIRE according to various embodiments shows a great potential as a reliable tool for predicting climate impacts on crop productivity.

As described herein, various embodiments provide a data-driven approach to generate parsimonious statistical models for inference of environmental controls on crop yields and predictions of yield spatio-temporal variations. Unlike certain conventional approaches that calibrate predictive models using training data generated from process-based model simulations, various embodiments of the ASPIRE model use LASSO to realize robust model parameterization directly from observation data. The case study for corn production in Illinois from 2000 to 2016 demonstrates that this data-driven framework can attain comparable and even better predictive skills compared with certain conventional approaches. More importantly, the model structure and performance of various embodiments remain stable and robust under various data availability scenarios, which implies this approach (i.e., of such embodiments) is spatially scalable and can be used to downscale crop yield information. The resultant model structure and parameters suggest biomass and water stress during key reproduction phenological stages are the major drivers of corn yield variations in Illinois while radiation during reproductive phenological stages and soil conditions might also play a role. Various framework embodiments described herein can include machine-learning algorithms and one or more novel remote sensing products. Various framework embodiments described herein can be extended, for example, to other major corn states, small scale corn production regions, and other crop types can offer additional and more comprehensive evaluation of the framework. Finally, the knowledge gained from such data-driven approaches can also provide useful information for future development of additional process-based agriculture models.

From the foregoing descriptions, it would be evident to an artisan with ordinary skill in the art that the aforementioned embodiments can be modified, reduced, or enhanced without departing from the scope and spirit of the claims described below. For example, various embodiments can be applied to any desired crop type (e.g., soybean, wheat). Other suitable modifications can be applied to the subject disclosure. Accordingly, the reader is directed to the claims for a fuller understanding of the breadth and scope of the subject disclosure.

Figure 13:
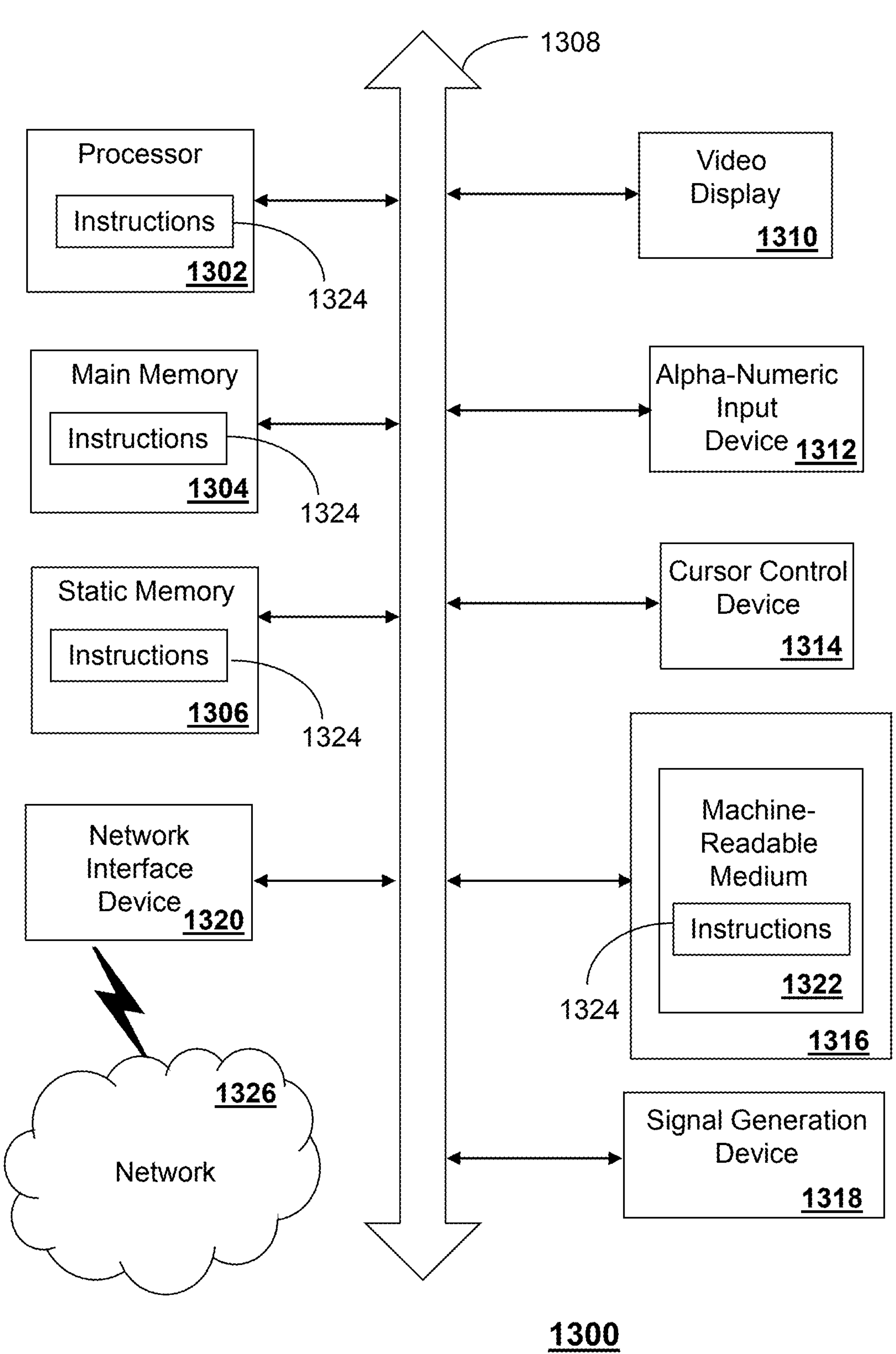
FIG. 13 depicts an embodiment showing an illustrative diagrammatic representation of a machine in the form of a computer system within which a set of instructions, when executed, may cause the machine to perform any one or more of the methodologies disclosed herein.

FIG. 13 depicts an exemplary diagrammatic representation of a machine in the form of a computer system 1300 within which a set of instructions, when executed, may cause the machine to perform any one or more of the methods discussed above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310 (e.g., a liquid crystal display (LCD), a flat panel, or a solid state display. The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a tangible computer-readable storage medium 1322 on which is stored one or more sets of instructions (e.g., software 1324) embodying any one or more of the methods or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1322 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 300.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

REFERENCES

Azzari, G., Jain, M., & Lobell, D. B. (2017). Towards fine resolution global maps of crop yields: Testing multiple methods and satellites in three countries. *Remote Sensing of Environment.*

Barlow, K. M., Christy, B. P., O'Leary, G. J., Riffkin, P. A., & Nuttall, J. G. (2015). Simulating the impact of extreme heat and frost events on wheat crop production: A review. *Field Crops Research,* 171, 109-119.

Bobryk, C. W., Myers, D. B., Kitchen, N. R., Shanahan, J. F., Sudduth, K. A., Drummond, S. T., Gunzenhauser, B., & Gomez Raboteaux, N,N. (2016). Validating a Digital Soil Map with Corn Yield Data for Precision Agriculture Decision Support. *Agronomy Journal,* 108, 957-965.

Bokusheva, R., Kogan, F., Vitkovskaya, I., Conradt, S., & Batyrbayeva, M. (2016). Satellite-based vegetation health indices as a criteria for insuring against drought-related yield losses. *Agricultural and forest meteorology,* 220, 200-206.

Bolton, D. K., & Friedl, M. A. (2013). Forecasting crop yield using remotely sensed vegetation indices and crop phenology metrics. *Agricultural and forest meteorology,* 173, 74-84.

Boryan, C., Yang, Z., Mueller, R., & Craig, M. (2011). Monitoring US agriculture: the US department of agriculture, national agricultural statistics service, cropland data layer program. *Geocarto International,* 26, 341-358.

Boyer, J. S., Byrne, P., Cassman, K. G., Cooper, M., Delmer, D., Greene, T., Gruis, F., Habben, J., Hausmann, N., Kenny, N., Lafitte, R., Paszkiewicz, S., Porter, D., Schlegel, A., Schussler, J., Setter, T., Shanahan, J., Sharp, R. E., Vyn, T. J., Warner, D., & Gaffney, J. (2013). The U.S. drought of 2012 in perspective: A call to action. *Global Food Security,* 2, 139-143.

Burke, M., & Lobell, D. B. (2017). Satellite-based assessment of yield variation and its determinants in smallholder African systems. *Proceedings of the National Academy of Sciences.*

Cai, Y., Guan, K., Lobell, D., Potgieter, A., Wang, S., Peng, J., Xu, T., Asseng, S., Zhang, Y., You, L., & Peng. B. (Under review). Integrating satellite and climate data to predict wheatyield in Australia using machine learning approaches. *Agricultural and forest meteorology.*

Cai, Y., Guan, K., Peng, J., Wang, S., Seifert, C., Wardlow, B., & Li, Z. (2018). A high-performance and in-season classification system of field-level crop types using time-series Landsat data and a machine learning approach. *Remote Sensing of Environment,* 210, 35-47.

Cai, Y., Moore, K., Pellegrini, A., Elhaddad, A., Lessel, J., Townsend, C., Solak, H., & Semret, N. (2017). Crop yield predictions-high resolution statistical model for intra-season forecasts applied to corn in the US. In: Gro Intelligence, Inc.

Chaney, N. W., Wood, E. F., McBratney, A. B., Hempel, J. W., Nauman, T. W., Brungard, C. W., & Odgers, N. P. (2016). POLARIS: A 30-meter probabilistic soil series map of the contiguous United States. *Geoderma,* 274, 54-67.

Flatnes, J. E., & Carter, M. R. (2016). Addressing Climate Change Through Risk Mitigation: Welfare Implications of Index Insurance in Northeastern Tanzania. In R. Lal, D. Kraybill.

D. O. Hansen, B. R. Singh, T. Mosogoya, & L. O. Bik. (Eds.), *Climate Change and Multi-Dimensional Sustainability in African Agriculture: Climate Change and Sustainability in Agriculture* (pp. 569-590). Cham: Springer International Publishing.

Franch, B., Vermote, E. F., Becker-Reshef, L., Claverie, M., Huang, J., Zhang, J., Justice, C., & Sobrino, J. A. (2015). Improving the timeliness of winter wheat production forecast in the United States of America, Ukraine and China using MODIS data and NCAR Growing Degree Day information. *Remote Sensing of Environment,* 161, 131-148.

Frankenberg, C., & Berry, J. (2018). 3.10—Solar Induced Chlorophyll Fluorescence: Origins, Relation to Photosynthesis and Retrieval A2—Liang, Shunlin. *Comprehensive Remote Sensing* (pp. 143-162). Oxford: Elsevier.

Gitelson, A. A., Viña, A., Arkebauer, T. J., Rundquist, D. C., Keydan, G., & Leavitt, B. (2003). Remote estimation of leaf area index and green leaf biomass in maize canopies. *Geophysical Research Letters,* 30, n/a-n/a.

Gitelson Anatoly, A., Viña, A., Ciganda, V., Rundquist Donald, C., & Arkebauer Timothy, J. (2005). Remote estimation of canopy chlorophyll content in crops. *Geophysical Research Letters,* 32.

Gourdji, S. M., Sibley, A. M., & Lobell, D. B. (2013). Global crop exposure to critical high temperatures in the reproductive period: historical trends and future projections. *Environmental Research Letters,* 8, 024041.

Guan, K., Berry, J., Zhang, Y., Joiner, J., Guanter, L., Badgley, G., & Lobell, D. B. (2016). Improving the monitoring of crop productivity using spaceborne solar-induced fluorescence. *Global Change Biology,* 22, 716-726.

Guan, K., Medvigy, D., Wood, E. F., Caylor, K. K., Li, S., & Jeong, S.-J. (2014). Deriving vegetation phenological time and trajectory information over Africa using SEVIRI daily LAI. *Geoscience and Remote Sensing, IEEE Transactions on,* 52, 1113-1130.

Guan, K., Pan, M., Li, H., Wolf, A., Wu, J., Medvigy, D., Caylor, K. K., Sheffield, J., Wood, E. F., & Malhi, Y. (2015). Photosynthetic seasonality of global tropical forests constrained by hydroclimate. *Nature Geoscience,* 8, 284-289.

Guan, K., Wo, J., Kimball, J. S., Anderson, M. C., Frolking, S., Li, B., Hain, C. R., & Lobell, D. B. (2017). The shared and unique values of optical, fluorescence, thermal and microwave satellite data for estimating large-scale crop yields. *Remote Sensing of Environment,* 199, 333-349.

Guan, K., Li, Z., Rao, N., Feng, G, etc (2017) "Using MODIS-Landsat fused data and ALOS-2/PARSAR-2 to map paddy rice and estimate crop yield for Thai Binh Province in Viet Nam", *IEEE Journal of Selected Topics in Applied Earth Observations and Remote Sensing.*

Holzworth, D. P., Huth, N. I., de Voil, P. G., Zurcher, E. J., Herrmann, N. L., McLean, G., Chenu, K., van Oosterom, E. J., Snow, V., Murphy, C., Moore, A. D., Brown, H., Whish, J. P. M., Verrall, S., Fainges, J., Bell, L. W., Peake, A. S., Poulton, P. L., Hochman, Z., Thorburn, P. J., Gaydon, D. S., Dalgliesh, N. P., Rodriguez, D., Cox, H., Chapman, S., Doherty, A., Teixeira, E., Sharp, J., Cichota, R., Vogeler, L., Li, F. Y., Wang, E., Hammer, G. L., Robertson, M. J., Dimes, J. P., Whitbread, A. M., Hunt, J., van Rees, H., McClelland, T., Carberry, P. S., Hargreaves, J. N. G., MacLeod, N., McDonald, C., Harsdorf, J., Wedgwood, S., & Keating, B. A. (2014). APSIM-Evolution towards a new generation of agricultural systems simulation. *Environmental Modelling & Software,* 62, 327-350.

Jin, Z., Azzari, G., & Lobell, D. B. (2017). Improving the accuracy of satellite-based high-resolution yield estimation: A test of multiple scalable approaches. *Agric. For. Meteorol,* 247, 207-220.

Johnson, D. M. (2014). An assessment of pre- and within-season remotely sensed variables for forecasting corn and soybean yields in the United States. *Remote Sensing of Environment,* 141, 116-128.

Joiner, J., Yoshida, Y., Vasilkov, A., Schaefer, K., Jung, M., Guanter, L., Zhang, Y., Garrity, S., Middleton, E., & Huemmrich, K. (2014). The seasonal cycle of satellite chlorophyll fluorescence observations and its relationship to vegetation phenology and ecosystem atmosphere carbon exchange. *Remote Sensing of Environment,* 152, 375-391.

Kullback, S., & Leibler, R. A. (1951). On information and sufficiency. *The annals of mathematical statistics,* 22, 79-86.

Lancashire, P. D., Bleiholder, H., Boom, T. V. D., LangelÜDdeke, P., Stauss, R., Weber, E., & Witzenberger, A. (1991). A uniform decimal code for growth stages of crops and weeds. *Annals of Applied Biology,* 119, 561-601.

Lobell, D. B. (2013). The use of satellite data for crop yield gap analysis. *Field Crops Research,* 143, 56-64.

Lobell, D. B., Roberts, M. J., Schlenker, W., Braun, N., Little, B. B., Rejesus, R. M., & Hammer, G. L. (2014). Greater Sensitivity to Drought Accompanies Maize Yield Increase in the U.S. Midwest. *Science,* 344, 516-519.

Lobell, D. B., & Tebaldi, C. (2014). Getting caught with our plants down: the risks of a global crop yield slowdown from climate trends in the next two decades. *Environmental Research Letters,* 9, 074003.

Lobell, D. B., Thau, D., Seifert, C., Engle, E., & Little, B. (2015). A scalable satellite-based crop yield mapper. *Remote Sensing of Environment,* 164, 324-333.

Luo, Y., Guan, K., & Peng, J. (2018). STAIR: A generic and fully-automated method to fuse multiple sources of optical satellite data to generate a high-resolution, daily and cloud-/gap-free surface reflectance product. *Remote Sensing of Environment,* 214, 87-99.

Mathieu, J. A., & Aires, F. (2016). Statistical Weather-Impact Models: An Application of Neural Networks and Mixed Effects for Corn Production over the United States. *Journal of Applied Meteorology and Climatology,* 55, 2509-2527.

Peixoto, J., & Oort, A. H. (1996). The Climatology of Relative Humidity in the Atmosphere. *Journal of Climate,* 9, 3443-3463.

Rattalino Edreira, J. L., Mayer, L. L., & Otegui, M. E. (2014). Heat stress in temperate and tropical maize hybrids: Kernel growth, water relations and assimilate availability for grain filling. *Field Crops Research,* 166, 162-172.

Sakamoto, T., Gitelson, A. A., & Arkebauer, T. J. (2013). MODIS-based corn grain yield estimation model incorporating crop phenology information. *Remote Sensing of Environment,* 131, 215-231.

Sakamoto, T., Gitelson, A. A., & Arkebauer, T. J. (2014). Near real-time prediction of US corn yields based on time-series MODIS data. *Remote Sensing of Environment,* 147, 219-231.

Sakamoto, T., Yokozawa, M., Toritani, H., Shibayama, M., Ishitsuka, N., & Ohno, H. (2005). A crop phenology detection method using time-series MODIS data. *Remote Sensing of Environment,* 96, 366-374.

Sellers, P., Berry, J., Collatz, G., Field, C., & Hall, F. (1992). Canopy reflectance, photosynthesis, and transpiration. III. A reanalysis using improved leaf models and a new canopy integration scheme. Remote Sensing of Environment, 42, 187-216.

Soil Survey Staff (2014). Natural Resources Conservation Service, United States Department of Agriculture. Web Soil Survey.

Urban, D., Guan, K., & Jain, M. (2018). Estimating sowing dates from satellite data over the U.S. Midwest: A comparison of multiple sensors and metrics. *Remote Sensing of Environment,* 211, 400-412.

Urban, D. W., Roberts, M. J., Schlenker, W., & Lobell, D. B. (2015). The effects of extremely wet planting conditions on maize and soybean yields. *Climatic Change,* 130, 247-260.

Wilhelm, E. P., Mullen, R. E., Keeling, P. L., & Singletary, G. W. (1999). Heat Stress during Grain Filling in Maize: Effects on Kernel Growth and Metabolism. *Crop Science,* 39, 1733-1741.

Xu, T., Guan, K., Peng, B., Nafziger, E., Irwin, S., Li, Y., Zhao, L., & Valocchi, A. (in review). Spatio-temporally varying responses of rainfed corn yield to climate, soil and managements in the U.S. Corn Belt: a data-driven analysis and modeling effort. *Global Change Biology.*

You, J., Li, X., Low, M., Lobell, D., & Ermon, S. (2017). Deep Gaussian Process for Crop Yield Prediction Based on Remote Sensing Data. In, *AAAI* (pp. 4559-4566).

Zhang, P., Anderson, B., Tan, B., Huang, D., & Myneni, R. (2005). Potential monitoring of crop production using a satellite-based Climate-Variability Impact Index. *Agricultural and forest meteorology,* 132, 344-358.

What is claimed is:

1. A device for creating a model capable of predicting and/or estimating crop yield and for predicting and/or estimating crop yield, the device comprising:

a processing system including a processor; and a memory that stores executable instructions that, when executed by the processing system, perform operations, the operations comprising:

defining a set of at least one geographic region;

obtaining a set of environmental, weather, soil, and satellite-derived remote sensing variables in the set of at least one geographic region during a first set of one or more time windows, wherein the set of variables is associated with a crop and wherein the obtaining of the set of variables at least partially involves converting the remote sensing variables to a geographic projection using nearest neighbor resampling;

training a yield model, wherein the set of variables is a first set of inputs to the yield model, and wherein the training utilizes machine learning and comprises:

generating a gap-free, smoothed time series of a metric for a plurality of dates by applying a Savitzky-Golay filter to the geographic projection for each geographic region of the set of at least one geographic region;

determining a date when the metric exhibits a particular characteristic;

applying a plurality of time shifts to the time series on the determined date to estimate an occurrence of a phenology stage of the crop;

calculating a fraction of pixels that have achieved a threshold of the phenology stage based, at least in part, on each time shift of the plurality of time shifts;

conducting regressions using the calculated fractions to predict yield data;

comparing the predicted yield data to actual yield data;

selecting at least one time shift from the plurality of time shifts based on an error of the at least one time shift, the error being extracted from the conducted regressions and wherein the first set of one or more time windows is defined based on the at least one time shift;

performing additional regressions using least absolute shrinkage and selection operator (LASSO), wherein inputs to the additional regressions comprise the remote sensing variables, the geographic projection, the time series, or the at least one time shift;

predicting, after the training, a first predicted yield for a first region via the trained yield model;

identifying a unit of land, and identifying an occurrence of a second phenology stage of the crop for the unit of land, resulting in a second occurrence;

obtaining a second set of environmental, weather, soil, and satellite-derived remote sensing variables for the unit of land during a second set of one or more time windows defined based on the second occurrence; and generating a second predicted yield using the trained yield model, and using the second set of environmental, weather, soil, and satellite-derived remote sensing variables as a second set of inputs to the trained yield model, wherein the second predicted yield covers a second region that is smaller than the first region;

wherein the yield model is capable of modeling one or more crop yields at a pixel scale.

2. The device of claim 1, wherein the occurrence of the phenology stage comprises multiple phenology stages of the crop.

3. The device of claim 1, wherein the satellite data is real-time satellite data.

4. The device of claim 1, wherein:

the first region is on a scale of a country, state, county, or user-defined region; and the second region is on a scale of a farm, field, or portion of a field.

5. The device of claim 1, wherein the first predicted yield is based on an aggregation of a plurality of models of yields at a pixel scale or at a field scale within the first region.

6. The device of claim 1, wherein the crop is corn, soybean, wheat, rice, cotton, or other row crops.

7. The device of claim 1, wherein the set of at least one geographic region is on a scale of a country, state, county, single farm, single field, or user-defined region.

8. The device of claim 1, wherein the metric is green chlorophyll vegetation index and the particular characteristic is a maximum.

9. The device of claim 1, wherein the operations further comprise:

generating a yield map for the first region based on the first predicted yield for the first region; and generating a second yield map for the second region based on the second predicted yield for the second region.

10. A method for use with predicting and/or estimating crop yield, the method comprising:

obtaining satellite data associated with a crop in a first set of one or more geographical regions;

obtaining additional data associated with the crop in a second set of one or more geographical regions, wherein the second set of one or more geographical regions at least partially overlaps the first set of one or more geographical regions;

obtaining actual yield information regarding the crop in a third set of one or more geographical regions, wherein the third set of one or more geographical regions at least partially overlaps the first set of one or more geographical regions or the second set of one or more geographical regions;

extracting, calculating, or deriving a first set of variables from the satellite data and/or the additional data over at least partially overlapping geographical regions from the first set, second set, and/or third set by sampling from the satellite data in the at least partially overlapping geographical regions and/or sampling from the additional data in the at least partially overlapping geographical regions, wherein the sampling is performed by iterating over pixels of the satellite data or additional data and selecting pixels that either partially or fully overlap the first set of one or more geographical regions, the second set of one or more geographical regions, and/or the third set of one or more geographical regions, and wherein the extracting, calculating, or deriving of the first set of variables at least partially involves converting the satellite data to a geographic projection using nearest neighbor resampling;

training a yield model, resulting in a trained yield model, wherein the yield model receives the first set of variables as input, and wherein a goal of the trained yield model is to minimize a difference between predicted yield information output by the yield model regarding the crop in the third set of one or more geographical regions and the actual yield information regarding the crop in the third set of one or more geographical regions, and wherein the training utilizes machine learning and comprises:

generating a gap-free, smoothed time series of a metric for a plurality of dates by applying a Savitzky-Golay filter to the geographic projection for each geographical region of the first set of one or more geographical regions;

determining a date when the metric exhibits a particular characteristic;

applying a plurality of time shifts to the time series on the determined date to estimate an occurrence of a phenology stage of the crop;

calculating a fraction of pixels that have achieved a threshold of the phenology stage based, at least in part, on each time shift of the plurality of time shifts;

conducting regressions using the calculated fractions to predict yield data;

comparing the predicted yield data to actual yield data;

selecting at least one time shift from the plurality of time shifts based on an error of the at least one time shift, the error being extracted from the conducted regressions;

performing additional regressions using least absolute shrinkage and selection operator (LASSO), wherein inputs to the additional regressions comprise the satellite data, the geographic projection, the time series, or the at least one time shift;

defining a fourth set of one or more geographical regions wherein the fourth set of one or more geographical regions is smaller than the first, second, or third sets of one or more geographical regions in area;

extracting, calculating, or deriving a second set of variables from satellite data and/or additional data over the fourth set of one or more geographical regions, by sampling from the satellite data and/or the additional data over the fourth set of one or more geographical regions; and predicting yield information regarding the crop in the fourth set of one or more geographical regions using the trained yield model.

11. The method of claim 10, wherein the phenology stage comprises a reproductive period.

12. The method of claim 10, wherein the additional data associated with the crop in the second set of one or more geographical regions comprises climate data, weather data, environmental data, soil data, surface reflectance data, crop biomass data, water stress data, vapor pressure deficit, and/or vegetation indices.

13. The method of claim 10, wherein each of the first, second, third, and fourth sets of one or more geographical regions is/are on a scale of a country, state, county, single farm, single field, or user-defined region.

14. The method of claim 10, wherein the metric is green chlorophyll vegetation index and the particular characteristic is a maximum.

15. The method of claim 10, further comprising generating a yield map for the predicted yield information regarding the crop in the fourth set of one or more geographical regions.

16. A method of training and/or applying a machine-learning model capable of predicting and/or estimating crop yield, the method comprising:

training a machine-learning model via the steps comprising:

obtaining, from a dataset, actual yield data associated with a crop;

obtaining, from a second dataset, satellite data associated with the crop;

converting the satellite data to a geographic projection using nearest neighbor resampling;

generating a gap-free, smoothed time series of a metric for a plurality of dates by applying a Savitzky-Golay filter to the geographic projection;

determining a date when the metric exhibits a particular characteristic;

applying a plurality of time shifts to the time series on the determined date to estimate an occurrence of a phenology stage of the crop;

calculating a fraction of pixels that have achieved a threshold of the phenology stage based, at least in part, on each time shift of the plurality of time shifts;

conducting regressions using the calculated fractions to predict yield data;

comparing the predicted yield data to actual yield data;

selecting at least one time shift from the plurality of time shifts based on an error of the at least one time shift, the error being extracted from the conducted regressions;

performing additional regressions using least absolute shrinkage and selection operator (LASSO), wherein inputs to the additional regressions comprise the satellite data, the geographic projection, the time series, or the at least one time shift.

17. The method of claim 16, wherein the metric is green chlorophyll vegetation index and the particular characteristic is a maximum.

18. The method of claim 16, further comprising generating a yield map showing a predicted yield in a region wherein the predicted yield is based on the predicted yield data.

* * * * *